(12) United States Patent
Zunino et al.

(10) Patent No.: US 7,337,365 B2
(45) Date of Patent: *Feb. 26, 2008

(54) PLATFORM FOR COMPUTER PROCESS MONITORING

(75) Inventors: Gilles Zunino, Bellevue, WA (US); Bradley Ray Green, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 220 days.

This patent is subject to a terminal disclaimer.

(21) Appl. No.: 11/215,552

(22) Filed: Aug. 29, 2005

(65) Prior Publication Data

US 2006/0005085 A1 Jan. 5, 2006

Related U.S. Application Data

(63) Continuation of application No. 10/167,836, filed on Jun. 12, 2002, now Pat. No. 7,000,150.

(51) Int. Cl.
*G06F 11/00* (2006.01)

(52) U.S. Cl. .......................................... 714/38; 714/46

(58) Field of Classification Search ................ 714/38, 714/46, 57
See application file for complete search history.

*Primary Examiner*—Bryce P Bonzo
(74) *Attorney, Agent, or Firm*—Merchant & Gould; Ryan T. Grace

(57) ABSTRACT

Monitoring components that provide monitors for computer processes are disclosed, including a monitoring component that provides multiple monitors that may be selectively activated for a particular process where each monitor is responsive to a different type of event that signifies a defect. The monitoring component provides monitors including a debugger monitor, window monitor, a hang monitor, and a timeout monitor that may individually or collectively be activated for a process. A Remote Monitoring component is disclosed that consolidates control for multiple monitoring components instantiated for multiple processes on one computer where each monitoring component has one or more monitors that are activated. A Remote Monitor Client component is also disclosed and consolidates control for multiple remote monitoring components that are instantiated on multiple computers to control monitoring components attached to the distributed processes of one or more applications.

20 Claims, 7 Drawing Sheets

PLATFORM FOR COMPUTER PROCESS MONITORING

RELATED APPLICATIONS

This application is a continuation of application Ser. No. 10/167,836, filed Jun. 12, 2002, now U.S. Pat. No. 7,000,150 which application is incorporated herein by reference.

TECHNICAL FIELD

The present invention relates to a platform for monitoring processes of computers. More specifically, the present invention relates to monitoring components for monitoring one or more processes being performed on one or more computers.

BACKGROUND

Monitoring of processes that computers perform when implementing one or more applications is done to detect whether a process being performed is defective. For example, the process can result in an exception that disrupts the normal operation of the computer application, and a defective process may cause the application or computer system to eventually experience a non-functional or defective state. Thus, monitoring of the processes being performed allows the problem for a particular process to be detected, and a correction to the defective process may be more easily developed once the defective process is found.

Conventionally, various types of monitors for computer processes are packaged individually. As an example, a debugger monitor used to find processes generating exceptions is conventionally packaged separately from a window monitor that is used to detect events occurring within a window of a graphical user interface. If a particular monitor type is not responsive to the type of event that must be detected for a defective process, then another monitor package must be implemented. This creates an inconvenience for the programmer attempting to develop the solution to the defective process because multiple monitor packages may be required. Each monitor package may be implemented, either simultaneously or consecutively, on a computer experiencing a defective process until the appropriate monitor detects an event that reveals the defective process.

Furthermore, modern computers implement multiple processes simultaneously, and detecting which process being performed on a computer is the defective one requires that each process be monitored, either simultaneously or consecutively, until the defective process is found. As discussed above, monitoring packages providing a single monitor type are implemented simultaneously or consecutively for each process to be monitored. Therefore, the complexity of finding a defective process significantly increases when monitoring multiple processes on a computer.

Distributing processes of one or more applications among a set of networked computers is now possible due to the prevalence of local area networks (LANs), wide area networks (WANs), and the Internet and the development of distributed object models. However, finding defective processes of an application where the processes to be monitored are distributed among multiple computers adds significantly more complexity. Multiple monitoring packages may be utilized for each process of a computer, and this is done for each computer within the distribution. The results provided by each monitoring package must then be manually assimilated and analyzed by the programmer to determine which process of which computer is the defective one. The result is an overly complicated procedure for finding defective processes in the distributed system.

SUMMARY

The present invention addresses the difficulties discussed above and others by providing a platform for computer process monitoring. For example, the platform for computer process monitoring may include monitoring at least one process of at least one computer using a monitoring package that provides multiple monitors. The monitors may be selectable so that one or more may be implemented for a process at the same time to simultaneously look for different types of events that may signify a defective process. Furthermore, computer process monitoring may include monitoring more than one process on a computer simultaneously with a monitor attached to each process and a centralized control for each of the monitors being used to manage finding the defective process. Additionally, where processes are distributed, computer process monitoring may include monitoring on multiple computers at least one process with at least one monitor and having a local control for each computer and a centralized control for each local control to manage finding the defective process of a particular computer.

For example, providing monitoring for a process on a computer involves instantiating on the computer a monitoring component that provides a set of monitors and at least one interface, and the monitoring component is programmatically instructed to attach to the process to be monitored. One or more of the monitors from the set are selectively activated when instantiating the monitoring component, and each of the one or more monitors is responsive to a particular type of event. Events of the process are detected with the one or more monitors that are activated, and an indication of each detected event is reported through an interface of the monitoring component.

Providing monitoring for multiple processes on a computer involves instantiating a Remote Monitoring component for controlling individual monitoring components, and the Remote Monitoring component has at least one interface. For each process being monitored under the Remote Monitoring component, an individual monitoring component providing at least one monitor and at least one interface is instantiated on the computer. For each instantiated individual monitoring component, at least one monitor of the monitoring component that is responsive to a particular type of event is activated. Events are detected with the monitors of the monitoring component attached to each process. When the monitors for a process detect an event, an indication of the event is reported through the interface of the monitoring component to the Remote Monitoring component. Once an indication of the event is reported to the Remote Monitoring component, the event is reported to the user from the Remote Monitoring component through the interface of the Remote Monitoring component.

When providing monitoring of processes distributed among multiple computers, a Remote Monitor Client component is instantiated on a computer that is networked with the computers performing the distributed processes. The Remote Monitor Client component controls Remote Monitoring components that are implemented on the plurality of computers, and the Remote Monitor Client component provides at least one interface. On each computer running a process being monitored, a Remote Monitoring component is instantiated. The Remote Monitoring component controls at least one individual monitoring component and provides at least one interface.

For each process being monitored among the networked computers, an individual monitoring component that provides at least one monitor and at least one interface is instantiated on the computer running the process. For each instantiated monitoring component, at least one monitor is activated and is responsive to a particular type of event of the processes of the computer. The monitor for each process detects events, and when an event is detected, the monitoring component reports an indication of the event and the process where the event occurred through the at least one interface to the Remote Monitoring component. When the Remote Monitoring component obtains an indication of an event from the monitoring component, the indication of the event, the process where the event occurred, and the computer running the process from the Remote Monitoring component is reported to the Remote Monitor Client component.

The present invention may be more clearly understood and appreciated from a review of the following detailed description and by reference to the drawings and claims.

DETAILED DESCRIPTION

Embodiments of the present invention provide methods, computer systems, and computer-readable media for monitoring one or more processes occurring within application programs of one or more computers. In the following detailed description, references are made to the accompanying drawings that form a part hereof, and in which are shown by way of illustration of specific embodiments or examples. These embodiments may be combined, other embodiments may be utilized, and structural changes may be made without departing from the spirit and scope of the present invention. The following detailed description is, therefore, not to be taken in a limiting sense, and the scope of the present invention is defined by the appended claims and their equivalents.

Figure 1:
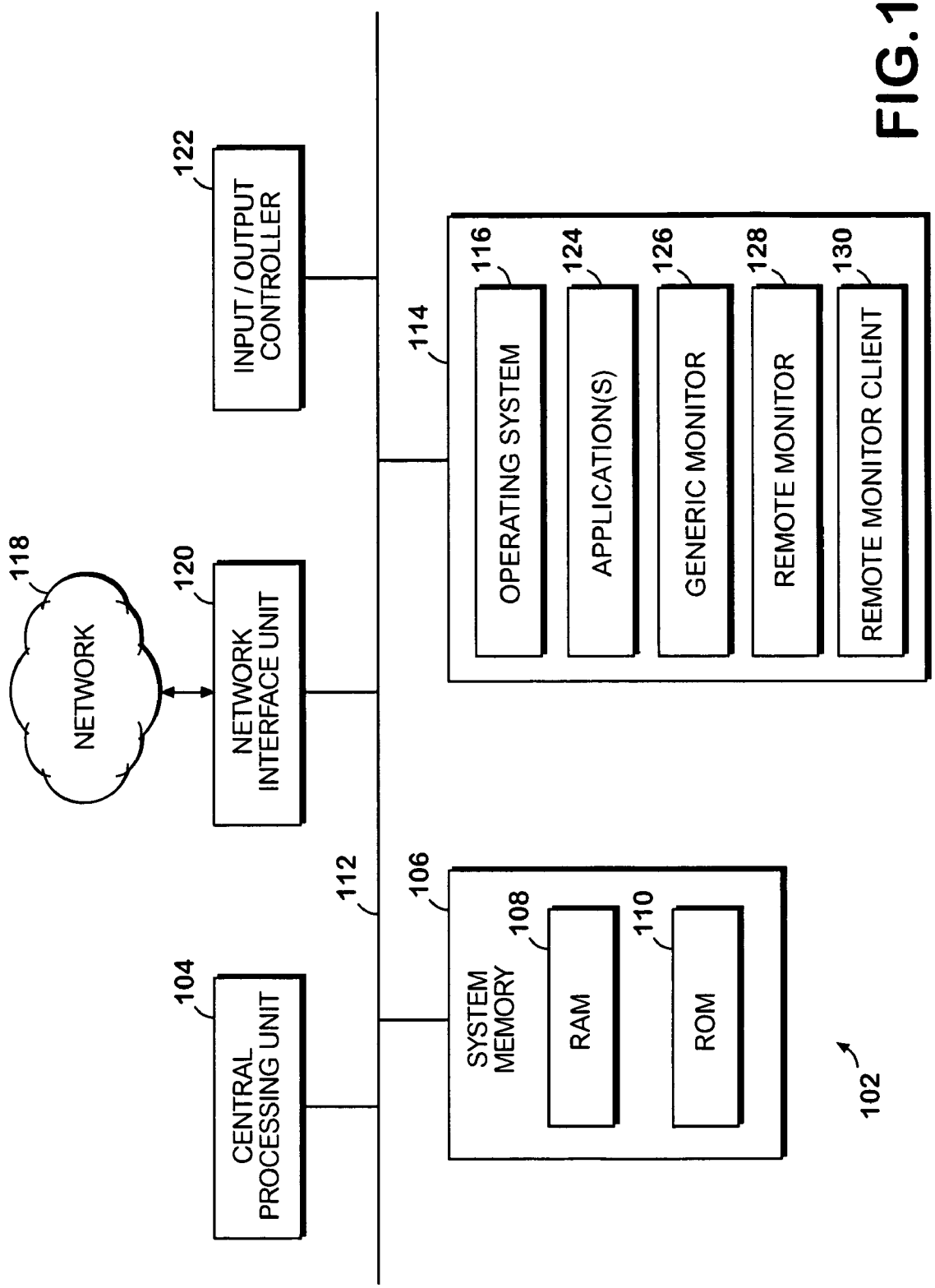
FIG. 1 shows the major components of a computer environment for implementing embodiments of the present invention where a monitoring component provides multiple monitors for a computer process.

Referring now to the drawings, in which like numerals represent like elements through the several figures, aspects of the present invention and the exemplary operating environment will be described. FIG. 1 and the following discussion are intended to provide a brief, general description of a suitable computing environment in which the invention may be implemented. While the invention will be described in the general context of program modules that execute in conjunction with application programs that run on an operating system on a personal computer, those skilled in the art will recognize that the invention may also be implemented in combination with other program modules. Generally, program modules include routines, programs, components, data structures, and other types of structures that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention as applied to the personal computer of FIG. 1 may also be practiced in distributed computing environments where tasks are performed by remote processing devices that are linked through a communications network. In a distributed computing environment, program modules may be located in both local and remote memory storage devices and the distributed computing environment and program modules are discussed in more detail below with reference to FIGS. 7-9.

FIG. 1 shows an illustrative computer architecture for a personal computer 102 for practicing the various embodiments of the invention. The computer architecture shown in FIG. 1 illustrates a conventional personal computer, including a central processing unit 104 ("CPU"), a system memory 106, including a random access memory 108 ("RAM") and a read-only memory ("ROM") 110, and a system bus 112 that couples the memory to the CPU 104. A basic input/output system containing the basic routines that help to transfer information between elements within the computer, such as during startup, is stored in the ROM 110. The personal computer 102 further includes a mass storage device 114 for storing an operating system 116 and application programs, such as the application program 124 where processes are occurring that are being monitored.

The mass storage device 114 also stores one or more modules that provide various monitoring functions. The monitoring modules 126, 128, and/or 130 may be implemented in various forms, such as but not limited to dynamic-link libraries or otherwise executable file types. Furthermore, these monitoring modules may be implemented using the component object model ("COM"), the distributed component object model ("DCOM") or alternative frameworks allowing the implementation of software in terms of components and may be employed on computers running various operating systems 116 that provide access to various application program interfaces ("API"), such as the Windows® API. FIG. 1 shows the presence of all three monitoring modules 126, 128, and 130 on the storage device 114 of a single computer 102. However, as discussed below, various combinations of the monitoring modules may be present on the storage device 114, and therefore the presence of all three modules on the single computer 102 in FIG. 1 should be understood as an example and not a limitation.

For example a Generic Monitors module 126 may be present absent the two other modules where a single process is to be monitored for a client. Alternatively, a Remote Monitor module 128 may be present absent the two other modules where an instantiation from it controls multiple event sources other than the Generic Monitors module 126 or where the instantiation reports events detected by an event source over a network 118 to an instantiation from a Remote Monitor Client module 130 that is present on a different computer. The Remote Monitor will be referred as a Remote Monitor Local Server to distinguish the Remote Monitor from the Remote Monitor Client. The Remote Monitor Client module 130 may be present absent the two other modules where it resides on a computer 102 that communicates via the network 118 with other computers that implement a Remote Monitor Local Server module to provide detected events over the network 118 to the module 130 of the computer 102. Various other combinations where two modules or all three are present will be apparent to one skilled in the art.

The Generic Monitors module 126 may be present on the storage device 114 when at least one process on the computer 102 is to be monitored. Embodiments of the Generic Monitors module 126 include a monitoring component that provides multiple monitors, where the multiple monitors may be collectively or individually applied to a process to be monitored. For example, the Generic Monitors module 126 may provide a monitoring component that establishes five selectable monitors for a process including a service monitor, a debugger monitor, a windows monitor, a hang monitor, and a time out monitor. Each of these monitors is discussed in more detail below. Additionally the monitoring component instantiated from the Generic Monitors module 126 may provide an event handler that acts as an active filter for events being detected by each activated monitor prior to reporting them to a client.

Should multiple processes on the computer 102 need to be monitored, or if the processes of computer 102 are part of a distributed application where the detected events must be reported over the network 118, then a Remote Monitor Local Server module 128 may be included on the storage device 114. Embodiments of the Remote Monitor Local Server module 128 provide for instantiation of a Remote Monitor Local Server component that consolidates control for multiple monitoring components instantiated from the Generic Monitors module 126 and/or other event sources. Additionally or as an alternative, the Remote Monitor Local Server module 128 may be utilized to report results from an event source, such as a monitoring component instantiated from Generic Monitors module 126, over the network 118 to an instantiation from the Remote Monitor Client module 130.

Where the processes are distributed among a plurality of networked computers, a computer 102 implements the Remote Monitor Client module 130 to consolidate control of all of the instantiated Remote Monitor Local Server components on the networked computers. The instantiated Remote Monitor Local Server components consolidate control on each networked computer of the instantiated monitoring components. The instantiation from the Remote Monitor Client module 130 receives and stores event information transmitted by the Remote Monitor Local Server components. The APIs for the Remote Monitor Client allow a user of the client to view and sort this information at his convenience. Additional functionality may also be provided by the Remote Monitor Client module 130, such as prioritizing the events that are received in order of time and/or severity for presentation to the client.

The mass storage device 114 of the computer 102 is connected to the CPU 104 through a mass storage controller (not shown) connected to the bus 112. The mass storage device 114 and its associated computer-readable media, provide non-volatile storage for the personal computer 102. Although the description of computer-readable media contained herein refers to a mass storage device, such as a hard disk or CD-ROM drive, it should be appreciated by those skilled in the art that computer-readable media can be any available media that can be accessed by the personal computer 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments of the invention, the personal computer 102 may operate in a networked environment, such as where processes of the application are distributed among a plurality of networked computers, using logical connections to the remote computers through a network 118. Examples of such suitable networks would be Ethernet with the TCP/IP protocol or the Internet. The personal computer 102 may connect to the network 118 through a network interface unit 120 connected to the bus 112. It should be appreciated that the network interface unit 120 may also be utilized to connect to other types of networks and remote computer systems. The personal computer 102 may also include an input/output controller 122 for receiving and processing input from a number of devices, including a keyboard or mouse (not shown). Similarly, an input/output controller 122 may provide output to a display screen 124, a printer, or other type of output device.

As mentioned briefly above, a number of program modules and data files may be stored in the mass storage device 114 and RAM 108 of the personal computer 102, including an operating system 116 suitable for controlling the operation of a stand-alone or networked personal computer. The mass storage device 114 and RAM 108 may also store one or more application programs such as the application 124 and the monitoring modules 126, 128, and/or 130.

Embodiments of the present invention provide one or more of the monitoring program modules 126, 128, and 130. These program modules implement logical operations to monitor the one or more processes occurring within the application program 126 and/or other application programs. Embodiments of the instantiated components for each module are discussed below in relation to FIGS. 2, 4, and 7 while various embodiments of the logical operations of these program modules are discussed below with reference to FIGS. 3, 6, and 9. Additionally, the FIGS. 5 and 8 illustrate the instantiated components in relation to the processes being monitored.

Figure 2:
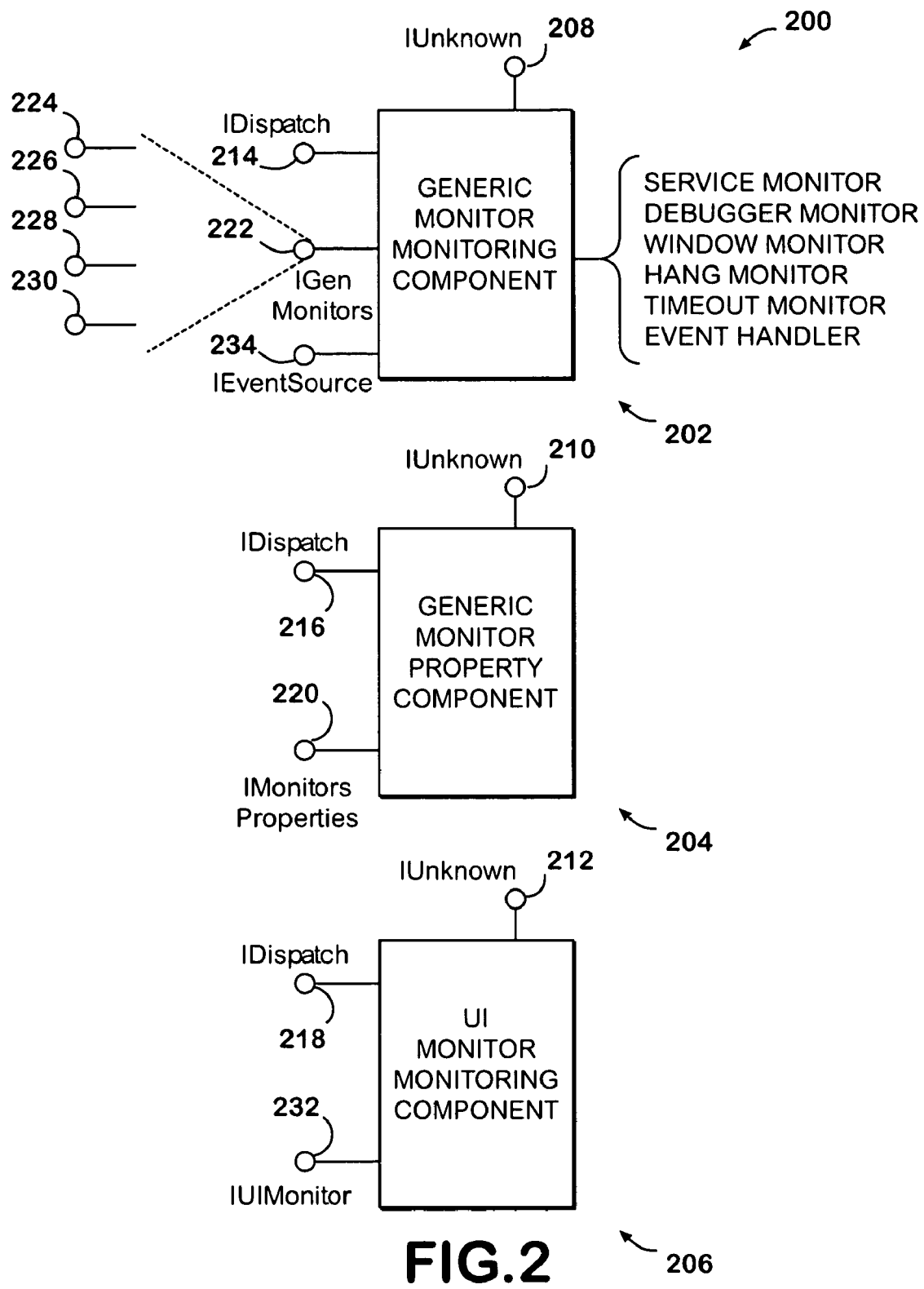
FIG. 2 shows the components of a monitoring module including the monitoring component that provides the multiple monitors.

In FIG. 2, the components of one embodiment 200 of the monitoring module 126 are shown as they occur when instantiated in computer memory 108. As shown, the components are implemented using COM. However, one skilled in the art will recognize that other frameworks allowing the implementation of software in terms of components or combinations of frameworks allowing the implementation of software in terms of components are also applicable, including using the common object request broker architecture ("CORBA"). These Generic Monitors components of FIG. 2 implement the monitoring of the individual processes of an application.

In addition to the well known IUnknown interfaces 208, 210, 212 and IDispatch interfaces 214, 216, and 218, three interfaces are exposed to the client in this embodiment. These include the Generic Monitors Properties interface ("IMonitorsProperties") 220 provided by the Monitor Property Component 204, the Generic Monitors Interface ("IGenMonitors") 222 provided by the Monitoring Component 202, and the UI Monitor interface ("IUIMonitor") 232 provided by the User Interface Monitoring Component 206. The User Interface Monitoring Component 206 is an optional component providing the optional IUIMonitor interface 232, which is useful for monitoring all window events occurring on the platform without reference to a single process. As discussed below, the window monitor provided by the component 206 is duplicated in the component 202 for window events of a specific process.

The Generic Monitors Properties component 204 and associated interface 220 allows the user to store information needed by the Generic Monitors component 202 in order to identify the software component the user wants to monitor, what Generic Monitors of component 202 to use in a monitoring session, create or attach to a process, monitor the process, terminate the process, and provide rich error reporting to the client. Examples of information stored in the Generic Monitors Properties interface 220 are the command line for the executable to be monitored, modules which are required to be loaded into the process to be monitored, and the symbol path for the process to be monitored. The Generic Monitors Properties interface 220 provides default values for many of the properties necessary to monitor a process, and new properties can be added to the interface 220 without interfering with any previous use of the interface.

Access to the monitors for a local process is provided to the client by the Generic Monitors interface component 202 and interface 222. This interface 222 acts as the control mechanism for the monitoring technology and notifications. In order to receive notifications, the client is required to provide component 202 a callback interface (with predefined entry points) via the IGenMonitors interface 222. These entry points are described below in the discussion of an event handling mechanism of the component 202.

Behind the IGenMonitors interface 222, there are six distinct sub-components or monitors. The first five sub-components of this embodiment are five Generic Monitors; specifically a service monitor, a debugger monitor, a hang monitor, a timeout monitor and a window (user interface) monitor. The sixth component is an event handler through which the monitors report error notifications to the client. What follows is a description of each of the Generic Monitors and the event handler.

The Timeout Monitor is responsible for monitoring the success and failure of being able to monitor a process. This is done by calculating the time that has elapsed between when the client instructs the monitoring component 202 to begin (or end) monitoring and the time when the monitors of component 202 are able to attach to or create the process (or detach from the process or wait for the process to close). The client provides, via the Generic Monitors Properties component 204 and associated interface 220, a timeout threshold. If the Timeout Monitor detects that the time monitoring component 202 takes to complete the client's request has exceeded this threshold, the monitor will report to the client a timeout failure. This failure will include all information that the monitoring component 202 can gather related to the timeout failure and report this information to the client via the event handler mechanism. The Timeout Monitor may be implemented under the Windows® operating system using the well-documented API WaitForSingleObject( . . . ).

The Debugger Monitor is responsible for detecting and reporting debugging events from the process to be monitored. Depending upon the properties the client sets in the Generic Monitors Properties component 204, the Debugger monitor is responsible for either attaching to or creating the target process as a system debugger. As such, it is notified of all system level debug events generated by the target software. Upon reception of these events, the debug monitor collects all pertinent information on the event (including defect information in the case of exception notifications) and notifies the client via the event handling mechanism. The Debugger Monitor may be implemented under the Windows® operating system using the well-documented APIs WaitForDebugEvent(), DebugActiveProcess( . . . ), and CreateProcess( . . . ).

The Hang Monitor is responsible for watching a windowed process for hang events. This is accomplished by measuring the time required for a windowed process to respond to a (no operation) window message. The client is responsible for setting a hang timeout threshold in the Generic Monitors Properties component 204. If the process fails to respond to the (no operation) window message within the threshold time set by the client, the hang monitor collects information related to this defect and reports that information to the client via the event handling mechanism. The hang monitor may be implemented under the Windows® operating system by using the well-documented API SendMessageWithTimeout( . . . ).

The Window Monitor need not be process specific. It is responsible for watching all user interface ("UI") events that occur on the local machine. When it is notified by the system of a UI event, it collects information on this event and reports this information to the client by the event handling mechanism. However, the window monitor can be associated with a process and instructed to only return windowed events created by the process under test. The window monitor may be implemented under the Windows® operating system by using the well-documented API SetWinEventHook( . . . ), and SendMessageWithTimeout( . . . ) may be used to collect information about the event. GetWindowThreadID( . . . ) can be used for filtering window events by process.

The service alert monitor, also called the service event monitor, is responsible for monitoring the service log for events produced by a Windows service process. The user is required to provide the file name of the service's log file. As described in the documentation for the Windows® API OpenEventLog in MSDN, this file name can be 'Application', 'Security', 'System' or a custom log file. The service alert monitor uses then uses the well-documented Windows® API NotifyChangeEventLog to request the OS to signal the monitor whenever a change is made to the specified log file. When notified of a change to the log file, the monitor will read the log and report back to the client any events that a service has logged to this file. In the case of multiple services sharing the same log file, it is up to the client to provide a means of filter the event notifications for those which are produced by the service under test.

When multiple monitors of the monitoring component 202 are activated for a process, it is beneficial to activate all monitors as a single thread, rather than implementing each monitor as an independent thread for a process. Thus, with a single thread, each monitor performs in sequence to detect an event of the process that is queued for the event handler. This sequence of monitor operations is repeated to continue detecting the particular type of events and reporting them to the queue. The event handling mechanism then deals accordingly with the indication of events in the queue The information gathered by these five monitors in order to report an event is extensible. Each monitor reports the error detected via a unique identification string. It also reports the condition that forced it to recognize an event as a defect (e.g. the timeout threshold that the monitor is currently using). Process specific information (e.g. the command line used to start the target application, the stack trace of the target application, the time the defect was observed) is available to each of the monitors through a number of additional sub-components built into the monitoring component 202 and described below. Further, if necessary, the monitors also provide information to the client that will allow it to handle errors at a higher level than is possible from a Generic Monitor (e.g. the Window Monitor provides the client with a window handle in the event that it detects a new window coming to focus which allows the client to save information stored in the window and manipulate the window).

The event handling mechanism is the means by which the client is notified of events detected by the Generic Monitors of monitoring component 202. This mechanism consists of a queue of information structures and an array of callback interfaces provided by the client. When there are no events in the queue the event handler blocks on a semaphore. The monitors create the information structures and insert these into the queue. Upon insertion, the event handler's semaphore is signaled awakening the event handler.

The event handler reads and removes the first item from the notification queue and passes this information to the client via the callback interfaces the client has provided to the monitoring component 202 through the IGenMonitors interface 222 (e.g., connection points 224, 226, 228, and 230 that map to the individual monitors of component 202 that have been activated). The callback interfaces provide notification to the client about every event that the monitors can detect and a mechanism for which the client can query for specific information related to that event (e.g. the stack trace associated to the event, the command line of the target process that produced the event).

As discussed above, the UI Monitor component 206 and interface 232 provides the client with a means of detecting UI events. This component 206 and interface 232 is provided as a matter of convenience. Behind the UT Monitor component 206 is the same event notification mechanism and Window Monitor provided to the user via the IGenMonitors interface 222. The UT Monitor interface 232 allows a client to be notified of UI events via a single callback instead of through multiple instances of the monitoring component 202.

The following is a detailed implementation of the Generic Monitoring module 200 in COM using the Windows® API. However, one skilled in the art will recognize that different COM implementations are possible and that implementations using different frameworks allowing the implementation of software in terms of components are possible as well. Therefore, the following detailed implementation is intended as an example only, and not as a limitation.

As discussed, the user sets the operating parameters of the instantiated Generic Monitor module 200 via the IMonitorsProperties interface 220. The following is a detailed description of the properties the user can set via this interface 220. A property can be either Read only (RO) meaning that the component allows an external component to read its value or Read/Write (RW) meaning that an external component can read and set the value of the property. In the following, the type of the property ((RO) or (RW)) is indicated.

A SymbolPath(RW) property specifies to the debugger monitor of component 202 the location of the symbols for the process to be monitored. This is not a required parameter and can be set to NULL. However, without it the stack dump provided by the debugger monitor may not be useful. If the symbol path provided is not correct and not NULL, then the target process may fail to launch.

The HangTime(RW) property is the time which the hang monitor will wait on a message before it determines that the target is hung. If the user does not set this value and AttachHangMon is set, the monitor will assume a hang time of 30 seconds. After reporting the first hang this monitor will detach from the target process and wait for a signal to shutdown. HangTime cannot be set to zero milliseconds. If it is, the monitoring component 202 will restore the default to 30 seconds.

The TimeoutTime (RW) property is the duration which the timeout monitor will wait for the target to start or stop before which the monitoring component 202 will signal a Timeout event. If this property is not specified and AttachTimeoutMon is set, the Timeout monitor will default to 30 seconds. After reporting the first timeout this monitor will detach from the target and wait for a signal to shutdown. TimeoutTime cannot be set to zero milliseconds. If it is, the monitoring component 202 will restore the default to 30 seconds.

The five Boolean properties AttachDebugMon(RW), AttachWindowsMon(RW), AttachHangMon(RW), AttachTimeoutMon(RW), and AttachServiceLogMon(RW) specify which monitors should be attached to the target. The user can specify any combination of these five monitors, however without any of them the target process can still be created. The values of these properties default to FALSE.

The TargeCmdLine(RW) property specifies the location of the executable to be monitored. Since the Generic Monitoring module 200 of this embodiment uses the Win32 API CreateProcess( . . . ) to start the target, this path should follow the guidelines of that API, such as those specified by the Microsoft® Developer Network ("MSDN").

A TargetWorkingDirectory(RW) property specifies the working directory for the process to be monitored. It is sent to CreateProcess without modification. The string must be a full path that includes a drive letter. If this parameter is NULL, the new process will have the same current drive and directory as the calling process. This feature is provided primarily for scripts that need to start an application and specify its initial drive and working directory.

The TargetWindowClasses(RW) property specifies the WindowClasses of the target to monitor for hangs. This entry can either be a SAFEARRAY of BSTR's of or a single basic string ("BSTR") specifying the windows classes of the target application. The first entry in this array, or the only entry if the user does not specify and array of window classes, is also used in retrieving an interface to the target (via the IGenMonitors::TargetObject method). This parameter must be set correctly if you wish to use the TargetObject method for any application which may need coercing to register itself in the running object table ("ROT").

A TargetProgID(RW) property is used in the implementation of the TargetObject property of IGenMonitors interface 222. This property is set to the ProgID of the target for the TargetWindowClasses property to work correctly.

The AttachToRunningProcess(RW) Boolean flag instructs the monitoring component 202 whether or not the debugger monitor should attach to a running process or create a new process. If the debugger monitor is not attached and this flag is set to VARIANT_TRUE, the monitors will insure that the process is running. If this flag is set to VARIANT_FALSE, the Generic Monitors will attempt to create the process. The default value for this property is VARIANT_FALSE.

The ModuleList(RW) property specifies the modules that must already be loaded into a process that the Generic Monitors will attempt to attach to. This property can either be a SAFEARRAY of BSTRINGS or a single "BSTRING". If the AttachToRunningProcess property is VARIANT_FALSE, this property has no affect on the operation of the Generic Monitoring component. Otherwise, on StartTarget the Generic Monitors component will search the running processes that match the TargetCmdLine property, and attach to the first process which has the specified modules loaded. If this property is empty and AttachToRunningProcess is VARIANT_TRUE, the Generic Monitors will attach to the first running process whose name matches that specified in the TargetCmdLine property.

The MiniDumpType(RW) property specifies the type of minidump requested for known defects. The minidump is dropped on a hang, timeout, or second chance exception. The MiniDumpType can take one of five values, of which the MINIDUMP_TYPE defined in DbgHelp.h is a subset. The five defined values are:

| | |
|---|---|
| 0xffff | No minidumps are generated |
| 0x0000 | MiniDumpNormal |
| 0x0001 | MiniDumpWithDataSegs |
| 0x0002 | MiniDumpWithFullMemory |
| 0x0004 | MiniDumpWithHandleData |
| 0x0008 | MiniDUmpFilterMemory |
| 0x0010 | MiniDumpScanMemory |

The EventFilterID(RW) property specifies the ProgID or CLSID of a component that implements an IEventFilter interface. This interface gives the user the opportunity to filter out messages and control what information is provided to a user in the case of a window event, debug event, or service log event. This low level filter is provided since the only generic type of event filtering that can be done is filtering by process and the collection of event information can be costly to application performance. For an example of how this is useful, consider that an assert caption or window class can change between products. Some products want to be notified of all window messages, some products want to be notified of all window messages, and some want a very small subset. Further, since creating a stacktrace and a minidump are expensive processes, creating them on every window event and debug event is very expensive. Thus, this property extends the usefulness of the monitors while keeping them generic. This property is a BSTR that should contain a ProgID or a GUID of the user created component which exposes the IEventFilter interface. By default is this property is set to GUID_NULL, which specifies that no event filtering will be done. When there is no event filter available, all window messages and all debug messages that are the result of the monitored process will be reported. In the case of a window event, service log event, or a first chance exception, the event reports will contain a stacktrace for the event, but a minidump will not be created. In the case of a second chance exception stacktrace will always be collected, and a minidump will be collected if the MiniDumpType property is set.

The ServiceLogFileName (RW) property specifies the file names of the service log files to be monitored by the service alert monitor. This property can either by a SAFEARRAY of BSTR's or a single BSTR. As described in MSDN, this array can contain "Application", "System", "Security", or a custom log file.

The monitoring component 202 provides the means by which the user starts the target application, monitors the application, and retrieves information regarding the state of the target application and the monitors. The user must not call StartTarget before the IMonitorsProperties method 220 is set. IGenMonitors interface 222 also implements IConnectionPointContainer 224-230 for each of the five types of connection points associated with the monitors. If this monitor is being used through a mechanism that does not support connection points then a generic connection point can be advised via the AttachEvent method. IGenMonitors 222 also supports IProvideClassInfo 2 for providing scripting languages with the ability to attach to its source interfaces. After any successful call to the StartTarget method, the user must call WaitForTargetShutdown to reset the state of the Generic Monitors. This call will not return until the target has been shutdown either by the user or by a call to TerminateTarget.

The following is a detailed description of the properties and methods of the IGenMonitors interface 222 for this example embodiment of the monitoring module 200. The properties include DriverInformation (RO) which returns an IVersionInformation interface describing the current version of the GenMon.DLL that you are using. TargetInformation (RO) returns an IVersionInformation interface containing the version information, if any, available in the resource segment of the target application. If no version information is available from the target, the IVersionInformation interface will report zero or null for each of its properties. TargetObject (RO) returns an interface to the target object if the target object supports automation and registers itself in the ROT. The property requires you to have set the TargetProgID value in IMonitorsProperties 220. Additional properties of IGenMonitors 222 include TargetProcessID (RO) which retrieves the Process ID of the target process. If the target is not running, or monitoring component 202 believes that the target has shutdown, this Process ID will be zero. IsTargetRunning (RO) is a Boolean value specifying whether or not the target is running. AreMonitorsAttached (RO) is a Boolean value specifying whether or not the monitors are attached to the target. MonitorProperties (RW, required) returns an IMonitorProperties interface identical to the one which was registered to the monitoring component 202.

The methods of the IGenMonitors interface 222 include the StartTarget method which starts the target and attaches the monitors. Properties for IMonitorProperties 220 are to be set before StartTarget is called. If StartTarget fails, the monitors do not run. The sequence of events that occur when you call StartTarget include the windows monitor being attached followed by the timeout monitor and then the debugger monitor. The process is started, and if debug support is not requested, the target is started without a debugger. The target process is created with a call to the CreateProcess API. After this process returns successfully, the monitoring component 202 will call the WaitForInputIdle API on the handle returned by CreateProcess. The timeout monitor is shutdown and then the hang monitor is attached. The method returns an HRESULT value signifying success or the reason for failure. The WaitForTargetShutdown method is required to shut down the monitors. It will only function after the target has been started and the monitors attached. After these process have been completed, WaitForTargetShutdown will allow messages to be processed, but will wait for the target process and all its child process to signal that they have closed. After which it shuts down all the monitors. A call to this method is required after a successful call to StartTarget. This method is guaranteed to succeed if called after StartTarget; insuring that the monitors are shutdown.

The sequence of events that occurs during the call to WaitForTargetShutdown is as follows. First, the hang monitor is detached followed by the timeout monitor. The monitoring component 202 enumerates all the child processes of the target process, and calls the WaitWithMessageLoop helper function to wait until each process is signaled. Under the Windows® operating system signals a process's HANDLE after that process has terminated. The debug monitor is then detached followed by the windows monitor. An event handler should not call this method. Events are reported to event handlers (connection points) synchronously. The TerminateTarget method provides the user with a means of interrupting the target at any time. This method can be called any time after a successful call to StartTarget. The instantiated module 200 uses the TerminateProcess API in order to shutdown the target. As such, the target may be left in a state that is unacceptable to further testing without a reboot. The AttachEvent method provides scripts with the ability to set callbacks for event notification. This method returns a cookie that may be used to detach the event handlers. The DetachEvent method is provided with the cookie returned by AttachEvent, and therefore, a script can detach its connection point from the instantiated module 200.

The UI monitor component 206 is a single instance of the Windows Monitor available through the IGenMonitors interface 222. As such, it is not tied to a specific instance of a process specific monitoring component 202. The IUIMonitor interface 232 is provided separately from an instance of monitoring component 202 in order to solve the problem of receiving multiple window messages from multiple instances of the monitoring component 202.

The StartMonitor method is used to start the UI monitor 206. Upon successful start, the method will return S_OK. If the monitor has already been started, it will return S_FALSE. The StopMonitor method is used to stop the UIMonitor 206. If the monitor 206 has been successfully stopped, this method will return S_OK. If the monitor 206 is not currently running, this method will return S_FALSE.

The AttachEvent method provides scripts with the ability to set callbacks for event notification. This method returns a cookie that may be used to detach the events.

The DetachEvent method is provided with the cookie returned by AttachEvent so that a script can detach its connection point from the instantiated monitoring component 200.

The monitoring component 202 uses connection points to notify its clients about events which occur in the monitors and the client. Event notification is synchronous. When a monitor either produces or detects an event they place that event in a notification queue. The event handler continuously watches this queue, and calls the clients back on the connection points with the information it obtains from this queue.

A relatively small number of events produced by certain monitors contain little or no information. These are events fired to inform a client of the state of the monitors. For instance, the hang monitor, timeout monitor and window monitor each fire an event on startup and shutdown which contains no information. The debug monitor will fire an event notifying the user when it is starting up or shutting down the target, and in these events it will provide the Process ID and Thread ID of the target application that it was assigned to instantiate. Although events produced by the monitors as a result of the monitors internal operation contain little or no information about the target process, events produced as a result of monitoring the target application are rich in information about the target application and what event has occurred.

The monitor produced events and information about the target process that are produced include the following:

| | |
|---|---|
| OnDebugPreStartTarget; | |
| OnDebugPostStartTarget | [Information sent: Process ID, Thread ID] |
| OnDebugPreStopTarget | [Information sent: Process ID] |
| OnDebugPostStopTarget | [Information sent: ProcessID] |
| OnHangMonitorStart | |
| OnHangMonitorShutdown | |
| OnTimeoutMonitorStart | |
| OnTimeoutMonitorShutdown | |
| OnWindowsMonitorStart | |
| OnWindowsMonitorShutdown | |
| OnServiceLogMonitorStart | |
| OnServiceLogMonitorShutdown | |

When a monitor reports an event produced by the target, it will report that event to the client with rich information about the event. This information can be retrieved via the IEventProperties interface. The events that reported via this interface are the following:

OnDebugEvent

OnHang

OnTimeout

OnWindowOpened

OnServiceLogEvent

Rich information about an event produced by the target application or target system is provided to client via an IEventProperties interface. This interface stores the value and description of a variable number of properties. This interface maintains a list of pairs (key/value) where the key is a long unsigned integer ("DWORD") and the value can be any kind of data. This interface has three methods. The first is the CountProperties method which provides the client with the number of properties contained in the interface. The GetPropertyInformation method provides the client with information about each property through an IPropertyInformation interface. This method takes a DWORD as an argument (the key of the property), and provides information about the property at the index of this argument.

The Read method returns the data associated with the IPropertyInformation argument provided to the method by the caller. This data is returned in the VARIANT argument of the method. The Read method also takes an initialized VARIANT argument though which it returns the value of the data. If the data is in a different format than the initialized variant, this method will attempt to convert the data into the form requested by the client.

The IPropertyInformation interface describes the data at the index of the argument by exposing properties of the data. The main item in this structure is the property name, or property ID. Every type of property the client receives has a unique name that can be used to identify that property. These names are described below. However, this interface contains more information than just the property name. This information includes the property type, variant type, clip board format, and CLSID (if any) associated with the property. This interface is modeled after the PROPBAG2 structure.

Every interface contains the following named properties with their associated type:

| | |
|---|---|
| "EVENT_TYPE" | (BSTR) |
| "EVENT_DESCRIPTION" | (BSTR) |
| "TARGET_CMD_LINE" | (BSTR) |

The process ID and thread ID are not available before the target has started up. However, the timeout monitor can signal an event before the target completes startup. For that reason, every interface will contain the following properties if they are available:

| | |
|---|---|
| "PROCESS_ID" | (DWORD) |
| "THREAD_ID" | (DWORD) |
| "STACK_TRACE" | (BSTR) |

Finally, minidumps are only generated for events which are guaranteed to be defects or for those events for which the user has specified a minidump should be created via the IEventFilter interface. By default these events are OnTimeout, OnHang, and OnDebugEvent which describe a second chance exception. The user has the option to create minidumps for OnWindowOpened events as well as first chance exceptions. For these events, if the MiniDumpType property is not 0xffff, the interface will contain the property "MINIDUMP_FILE_NAME" (BSTR). The value of this property is the full filename and path of the minidump. The values each monitor defines for these properties and a list of each monitor's own properties are enumerated below.

When the client specifies AttachDebugMon, the debugger monitor creates the process as with the DEBUG_PROCESS flag. As such, the system notifies the debug monitor's thread which created the process of every debug event generated by the target. These events are received via the WaitForDebugEvent API. Once the debug monitor receives notification about one of these events, it prepares an instance of IEventInformation and distributes that interface to clients listening on the IGenDebuggerMonitor connection point.

The debugger monitor tracks every process, thread, and DLL loaded by the target application. When it has received notice that the last process of the target application has terminated, it will close and wait for the user to call WaitForTargetShutdown. The value of the debugger monitors main two properties are:

| | |
|---|---|
| EVENT_TYPE = | "DEBUGGER_EVENT_TYPE" |
| EVENT_DESCRIPTION = | "A debug event was generated" |

The debugger also has a number of properties specific to events it watches. These are described below. In the discussion following and the description of the properties of other monitors, the same format will always be used. The first item in the description of the name of the property, the second is the property type, and the third is a description of the property.

"FILE_NAME" (BSTR): Name of the file in which the debugger event occurred.

"DEBUGGER_EVENT_TYPE" (BSTR): The type of debugger event that was produced by the target. This can be one of the following strings.

| |
|---|
| "EXCEPTION_EVENT" |
| "CREATE_PROCESS_EVENT" |
| "EXIT_PROCESS_EVENT" |
| "CREATE_THREAD_EVENT" |
| "EXIT_THREAD_EVENT" |
| "LOAD_DLL_EVENT" |
| "UNLOAD_DLL_EVENT" |
| "RIP_EVENT" |
| "OUTPUT_DEBUG_STRING_EVENT" |

In the event that the debugger detects an OUTPUT_DEBUG_STRING event, the following property is included in the notification.

"OUTPUT_DEBUG_STRING" (BSTR): The value of the string which was propagated to the debugger via the OutputDebugString API.

If the debugger detects an RIP event, it includes the following property.

"RIP_STRING" (BSTR): The string mapped to the error code that was propagated to the debugger via the RIP event.

And finally, if the debugger detects an exception, it includes the following three properties.

EXCEPTION_CODE" (DWORD): System defined value describing the type of exception caught.

"EXCEPTION_ADDRESS" (DWORD): The memory address at which the exception occurred.

"FIRST_CHANCE" (BOOL): True if this is a notification of a first-chance exception, false if it is a notification of a second chance exception.

In order for the debugger to run, the client must have set the property AttachDebugMon to VARIANT_TRUE, TargetCmdLine the command line to start the application or service, and SymbolPath to the location of the process's symbols if readable stack dumps are desired. To control how the debugger attaches to a target, the AttachToRunningProcess property is used.

While the target is running, the Hang Monitor attempts to see if it is alive by sending messages to the applications message loop. If one of these messages is not received in the timeout value specified for the monitor, the monitor will report a Hang Event. The values of the hang monitor's generic properties are:

| | |
|---|---|
| EVENT_TYPE = | "HANG_EVENT_TYPE" |
| EVENT_DESCRIPTION = | "The process window did not respond to SendMessageTimeout within the specified interval." |

The timeout monitor reports one additional property:

"HANG_TIMEOUT_VAL" (DWORD): The time the client specified for a hang event.

For the hang monitor to run, the client must have set AttachHangMon to VARIANT_TRUE, TargetWindowClasses to a non-NULL string, and SymbolPath to the location of the process's symbols if readable stack dumps are desired.

The Timeout Monitor is used to insure that the target was started/stopped correctly. It measures the time between the when monitoring component is told to start the target, and when the target actually starts. Additionally, it measures the time in which the monitoring component 202 waits for the target to shutdown and when the target actually shuts down. If either of these intervals exceeds the timeout time specified by the user in the IMonitorsProperties interface 220, the timeout monitor will report a Timeout Event. The values of the timeout monitor's generic properties are:

| | |
|---|---|
| EVENT_TYPE = | "TIMEOUT_EVENT_TYPE" |
| EVENT_DESCRIPTION = | "The startup/shutdown sequence did not signal completion within the allotted interval." |

The timeout monitor reports one additional property:

"TIMEOUT_VAL" (DWORD): The time the client specified for a timeout.

For the timeout monitor to run, the client must have the following properties specified AttachTimeoutMon as VARIANT_TRUE, and SymbolPath to the location of the process's symbols if readable stack dumps are desired.

The windows monitor provides the client with a notification about every window that comes to the foreground. This can be used to watch for windows created by assertion failures or any chosen window. The window monitor filters window events it receives by reading the process ID of the window that has come to the foreground. If this process ID is a child of the process that the monitoring component 202 is monitoring (or any n-depth child executable created by the process the monitoring component 202 is monitoring) than that window event is reported. For the UI monitor, no filtering is done on the windows events. All window events are reported through the UI monitors connection point. The values of the windows monitor's main properties are

| | |
|---|---|
| EVENT_TYPE = | "WINDOWMON_EVENT_TYPE" |
| EVENT_DESCRIPTION = | "A new window has come to the foreground." |

In addition, the windows monitor provides these properties to an event handler.

"WINDOW_CLAS" (BSTR): The class name of the window.

"WINDOW_CAPTION" (BSTR): The caption (title) of the window.

"WINDOW_MODULE_FILE_NAME" (BSTR): The name of the module that created the window.

"WINDOW_HANDLE" (BSTR): The handle to the window that has caused this event.

For the windows monitor to run, the client must have set the AttachWindowsMon property to VARIANT_TRUE.

The service event monitor provides the client with information about every log entry made to a services log file. This can be used to monitor any alert a service writes to the log. Services write out events to a log when they start, pause, resume, or shuts down, throw an exception, or otherwise depending upon their implementation. Whenever the service event monitor is signaled by the OS that an alert has been written to the service event log, the service event monitor reads each event from log and reports it back to the user. The values of the service event monitor's main properties are

| | |
|---|---|
| EVENT_TYPE = | "SERVICE_LOG_EVENT_TYPE" |
| EVENT_DESCRIPTION = | "The service event log has been updated." |

Further, all information that can be collected for each event read from the service's log is reported back to the user. The names of these properties are as follows. The descriptions of these properties come directly from the MSDN article documenting the EVENTRECORDLOG structure.

"TIMEGENERATED" (DWORD): Time the event was submitted to the log.

"TIMEWRITTEN" (DWORD): Time at which the event was written to the log.

"EVENTID" (DWORD): Event identifier. The value is specific to the event source for the event, and is used with SourceName to locate a description string in the message file for the event source.

"EVENTTYPE" (WORD): Type of event. This member can be one of the following values EVENTLOG_ERROR_TYPE, EVENTLOG_WARNING_TYPE, EVENTLOG_INFORMATION_TYPE, EVENTLOG_AUDIT_SUCCESS, or EVENTLOG_AUDIT_FAILURE.

"EVENTCATEGORY" (WORD): Category for this event. The meaning of this value depends on the event source.

"SOURCENAME" (BSTR): Variable-length null-terminated string that specifies the name of the event source.

"COMPUTERNAME" (BSTR) : Variable-length null-terminated string that specifies the name of the computer that generated this event.

"STRINGS" (SAFEARRAY of BSTR'S) : The event identifier together with SourceName and a language identifier identify a string that describes the event in more detail. The strings are used as replacement strings and are merged into the message string to make a complete message. The message strings are contained in a message file specified in the source entry in the registry.

"DATA" (SAFEARRAY of WORD'S): The binary information is information that is specific to the event. It could be the contents of the processor registers when a device driver got an error, a dump of an invalid packet that was received from the network, a dump of all the structures in a program (when the data area was detected to be corrupt), and so on. This information should be useful to the writer of the device driver or the application in tracking down bugs or unauthorized breaks into the application For the service event monitor to run, the client must have set AttachServiceLogMonitor to VARIANT_TRUE and provided one or more valid filenames to ServiceLogFileName.

The user can specify an event filter by providing a ProgID for a component that exposes the IEventFilter interface in the properties interface. This interface has only a single method:

```
HRESULT ShouldReportEvent(
    IEventProperties   * pEventProperties,
    VARIANT_BOOL       * pfShouldReport,
    VARIANT_BOOL       * pfCreateStackTrace,
    VARIANT_BOOL       * pfCreateMiniDump);
```

The first parameter is the event properties interface containing all the properties specified above except for the stack trace and the minidump file name. The other parameters are specifications that the user can set for how the monitoring component 202 will handle this event. pfShouldReport—if this value is VARIANT_TRUE, the event will be reported to the event handler. Else it will be ignored. pfCreateStackTrace—if this value is VARIANT_TRUE and pfShouldReport is VARIANT_TRUE, the application's stack trace will be created and appended to the event properties reported to the event handler. Else a stacktrace is not created. pfCreateMiniDump—if this value is VARIANT_TRUE and pfShouldReport is VARIANT_TRUE, the application's minidump will be created, and the minidump's filename will be appended to the event properties reported to the event handler. Else a minidump is not created.

Optional custom event sources can be attached to an instance of the instantiated Generic Monitors module 200. When the Generic Monitor component 200 starts, it enumerates all registered custom event sources defined into the CustomEventSourceGUIDs property of the IMonitorProperties interface 220. Typically, these custom event sources are components implemented using COM or other suitable frameworks allowing the implementation of software using components. An instance of every custom monitor is created and initialized. A custom event source can at runtime check the software environment it runs on and accept or decline running when initialized. If the custom event source accepts to start, it immediately becomes an event source and can fire events. If an event source declines to run, it is immediately shut down.

The Generic Monitor component 200 communicates with custom event sources using a simplified version of the IGenMonitors interface 222 (there is only one sub-component instead of five) called ICustomEventSource. Every custom event source receives properties set by the client with all custom data clients have stored. After being initialized, the custom event source becomes an event source identical to those prepackaged by the Generic Monitors component 200. The events a custom event source generates can be filtered by the event filter described above.

In addition to this custom event sources discovery logic, the Generic Monitor component 200 offers services for plugins through the IEventSource interface 234. This interface allows plugins to enumerate all available custom event sources. Custom event sources can then chain themselves at runtime, and extend capabilities of each other or use another event source's services to implement another event source. Custom event sources can also generate events which are not failures that include informative data (e.g., performance measurement data or code coverage).

When custom event sources are used, the Generic Monitoring component 200 communicates to each custom event source through the ICustomEventSource interface. This interface allows Generic Monitoring component 200 to ask the custom even source if it is appropriate for it to start through the Probe method:

HRESULT Probe(([in] IEvent Source*pSrc,
 [in] IRemoteSessionProperties*pProps,
 [out, retval] VARIANT_BOOL*pVarBool);

The pSrc parameter is an instance of the IEventSource interface 234 exposed by the Generic Monitoring component 200. The pProps parameter is an instance of IMonitorsProperties containing all the properties set by the user. A custom event source is free to use all these informations as well as other informations it can acquire by others means (including but not only the operating system version, the available software environment, the available hardware) to decide if it can run or not. If the custom event source decides to run, it returns VARIANT_TRUE into pVarBool and will participate to the event generation mechanism. If a custom event source returns VARIANT_FALSE, this event source will be shut down for the session and won't be able to create events.

The Generic Monitoring component 200 then first attempts to connect to every custom event sources callback's, so sources can start generating events. This is achieved through the SetCallback([in] ICustomEventMonitor*pCallback) method. This method accepts one parameter of type ICustomEventMonitor: the callback interface through which the custom event source will send all events it produces.

The ICustomEventMonitor callback interface is used by event sources to report their events. When the custom event source starts, it will call the callback's method OnCustomEventInit([in] GUID guid), passing as an argument its Global Unique Identifier (GUID). Then, when the custom event source wants to report en event, it calls OnNotifyCustomEvent ([in] IEventProperties*pDefect) passing all appropriate informations into pDefect (interface IEventProperties). The Global Unique Identifier of the custom event source which generated this event is included in the information reported through the callback interface. When the custom event source shuts down, it informs the Generic Monitor component 200 by calling OnCustomEventShutDown([in] GUID guid) and passing its Global Unique Identifier (GUID) into guid.

The IEventProperty instance passed to OnNotifyCustomEvent() can contain any appropriate data. There are three required data that must be set up by custom event source:

CUSTOM_EVENT_GUID (GUID): The Globally Unique Identifier of the event source

CUSTOM_EVENT_FATAL (BOOL): If VARIANT_TRUE, the event is fatal and the target can't continue. If VARIANT_FALSE, the event is marked as non fatal (i.e. the target can still be reliably been used).

CUSTOM_EVENT_STRING (String): A string describing the event being reported, suitable for display in an User Interface or into a log report.

The Generic Monitoring component 200 is also allowed to disconnect any custom event source callback's function by calling the RevokeCallbacko or the SetCallback() method with a NULL parameter. Disconnecting an event source should normally be done in only one circumstance: when the session ends and the software being monitored is not running anymore. However, custom event sources can be disconnected at any time. After being disconnected, a custom event source cannot signal the Generic Monitoring component 200 of events anymore. Once a custom source has been disconnected, it can't be reconnected anymore until the end of the session is reached. However, those skilled in the art will recognize that allowing such a reconnection is possible.

Then Generic Monitoring component 200 informs all custom event sources which accepted to run of the major phases of the monitoring process. When the session is started, a call is made to Start() with the event source interface of the Generic Monitoring component 200, as well as the monitors properties. These parameters are read only from the custom event source point of view and are sent only for informational purposes. While Load() informs custom event sources that a session is activated, all custom event sources are dormant (they do not create events) until the target is started. Custom event sources are encouraged to acquire all resources (including but not only memory blocks, files descriptors, locks) during the call to Load(), if appropriate.

When the target software is started, every custom event source receives a call to the method OnStart() with no parameter. This allows custom event sources to synchronize themselves with the start of the target application and start their own processing. Immediately after receiving the call to OnStart(), custom event sources transition from the "dormant" state to the "active" state. In the active state, custom event sources can create event and send them to the Generic Monitoring component 200 through the callback interface.

When the target software shuts down, every custom event source receives a call to the method OnStop(). This call makes the custom event source to transition from the "Active" state to the "dormant" state, meaning that the custom event source should not create events.

When the Generic Monitoring component 200 is asked to shutdown, it calls the Unload() on every custom event sources which accepted to start. The purpose of this call is to give custom action sources a chance to release the resources they acquired during their processing (including, but not only those acquired during the Load() call). After calling this method, the Generic Monitoring component 200 shuts down the custom even source and processes the remaining one.

When custom events sources are used, the IEventSource interface 234 exposed by the Generic Monitor Component 200 can be used by custom event sources to enumerate custom event sources. A custom event source can enumerate all custom event sources registered for the session using the EnumCustomSources([out, retval] IEnumVARIANTppEnum) method. This method returns a COM enumeration of all custom event sources regardless of the fact that they accepted or declined to run for this particular session. Custom event sources can also get the list of custom event sources which accepted to run by calling EnumRunningCustomSources([out, retval] IEnumVARIANTppEnum). The result of this function is an enumeration of all custom event sources which accepted to run. Note that these enumerations do not filter out custom event sources. It means that if a custom event source A acquires the enumeration of custom event sources, A will be in this enumeration.

The Interfaces of this example embodiment of the instantiated monitoring module 200 are defined below. IMonitorsProperites 220 is defined in Table 1.

TABLE 1

IMonitorsProperites

```
interface IMonitorsProperties : IDispatch
{
    // Symbols full path properties
    HRESULT SymbolPath([out, retval] BSTR * pStrSymPath);
    HRESULT SymbolPath([in] BSTR StrSymPath);
    // Hang monitor timeout
    HRESULT HangTime([out, retval] DWORD * pdwTimeOut);
    HRESULT HangTime([in] DWORD dwTimeOut);
    // Timeout monitor timeout
    HRESULT TimeoutTime([out, retval] DWORD * pdwTimeOut);
    HRESULT TimeoutTime([in] DWORD dwTimeOut);
    // Attach Debugger monitor?
    HRESULT AttachDebugMon([out, retval] VARIANT_BOOL * pfAttachDeb);
    HRESULT AttachDebugMon([in, defaultvalue(TRUE)] VARIANT_BOOL
        fAttachDeb);
    // Attach Windows monitor ?
    HRESULT AttachWindowsMon([out, retval] VARIANT_BOOL * pfAttachWin);
    HRESULT AttachWindowsMon([in, defaultvalue(TRUE)] VARIANT_BOOL
        fAttachWin);
    // Attach Hang monitor ?
    HRESULT AttachHangMon([out, retval] VARIANT_BOOL * pfAttachHang);
    HRESULT AttachHangMon([in, defaultvalue(TRUE)] VARIANT_BOOL
        fAttachHang);
    // Attach Timeout monitor ?
    HRESULT AttachTimeoutMon([out, retval] VARIANT_BOOL * pfAttachTime);
    HRESULT AttachTimeoutMon([in, defaultvalue(TRUE)] VARIANT_BOOL
        fAttachTime);
    // Attach Service Event Monitor
    HRESULT AttachServiceLogMon ([out, retval] VARIANT_BOOL * pfAttach);
    HRESULT AttachServiceLogMon ([in, defaultvalue(TRUE)] VARIANT_BOOL
        fAttach);
    // Target full path
    HRESULT TargetCmdLine([out, retval] BSTR * pStrCmdLine);
    HRESULT TargetCmdLine([in] BSTR pStrCmdLine);
    // Target working directory full path
    HRESULT TargetWorkingDirPath([out, retval] BSTR * pStrPath);
    HRESULT TargetWorkingDirPath([in] BSTR pStrPath);
    // Target main window classes
    HRESULT TargetWindowClasses([out, retval] VARIANT * pVarClasses);
    HRESULT TargetWindowClasses([in] VARIANT varClasses);
    // Target ProgID
    HRESULT TargetProgID([out, retval] BSTR * pStrProgID);
    HRESULT TargetProgID([in] BSTR StrProgID);
        // Attach to running process ?
    HRESULT AttachToRunningProcess(
            [out, retval] VARIANT_BOOL * pfAttachToRunningProcess);
```

TABLE 1-continued

| IMonitorsProperites |
|---|
| HRESULT AttachToRunningProcess(<br>    [in, defaultvalue(TRUE)] VARIANT_BOOL fAttachToRunningProcess);<br>// Target module list<br>HRESULT ModuleList([out, retval] VARIANT * pVarModules);<br>HRESULT ModuleList([in] VARIANT varModules);<br>// Event Filter ProgID<br>HRESULT EventFilterID([out, retval] BSTR * pStrEventFilterID);<br>HRESULT EventFilterID([in] BSTR StrEventFilterID);<br>// Service Log File Name list<br>HRESULT ServiceLogFileName ([out, retval] VARIANT * pVarLogs);<br>HRESULT ServiceLogFileName ([in] VARIANT varLogs);<br>// Custom Event Source<br>HRESULT CustomEventSourceGUIDs ([out, retval] VARIANT * pVarClasses);<br>HRESULT CustomEventSourceGUIDs ([in]    VARIANT    varClasses);<br>}; |

IGenMonitors interface 222 is defined in table 2.

TABLE 2

| IGenMonitors |
|---|
| interface IGenMonitors : IDispatch<br>{<br>    // Properties<br>    HRESULT DriverInformation([out, retval] IVersionInformation **<br>pdi);<br>    HRESULT TargetInfoInformation([out, retval]<br>IVersionInformation ** pti);<br>    HRESULT TargetObject([out, retval] IDispatch ** pDispatch);<br>    HRESULT TargetProcessID([out, retval] LONG * ppid);<br>    HRESULT IsTargetRunning([out, retval] VARIANT_BOOL *<br>pfRunning);<br>    HRESULT AreMonitorsAttached([out, retval] VARIANT_BOOL *<br>pfAttach);<br>    // Monitor properties<br>    HRESULT MonitorProperties([out, retval] IMonitorsProperties **<br>ppdp);<br>    HRESULT MonitorProperties([in] IMonitorsProperties * ppdp);<br>    // Starting/Stopping methods<br>    HRESULT StartTarget( );<br>    HRESULT WaitForTargetShutdown( );<br>    HRESULT TerminateTarget( );<br>    // Callback Advisory methods for JScript support<br>    HRESULT AttachEvent([in] IDispatch * pDispatch, [out, retval]<br>DWORD *<br>        pdwCookie);<br>    HRESULT DetachEvent([in] DWORD dwCookie);<br>}; |

IUIMonitor interface 232 is defined in Table 3.

TABLE 3

| IUIMonitor |
|---|
| interface IUIMonitor: IDispatch<br>{<br>    // Starting/Stopping Methods<br>    HRESULT StartMonitor( );<br>    HRESULT StopMonitor ( );<br>    // Callback Advisory methods for JScript support<br>    HRESULT AttachEvent ([in] IDispatch * pDispatch, [out, retval]<br>DWORD *<br>        pdwCookie);<br>    HRESULT DetachEvent ([in] DWORD dwCookie);<br>}; |

An IVersionInformation interface is defined in Table 4.

TABLE 4

| IVersionInformation |
|---|
| interface IVersionInformation : IDispatch<br>{<br>    HRESULT VersionMS([out, retval] long * pVal);<br>    HRESULT VersionLS([out, retval] long * pVal);<br>    HRESULT LocaleID([out, retval] long * pVal);<br>    HRESULT ExtendedInfo([out, retval] BSTR * pStr);<br>    HRESULT ToString([out, retval] BSTR * pStr);<br>}; |

An IGenDebuggerMonitor callback interface is defined in Table 5.

TABLE 5

| IGenDebuggerMonitor |
|---|
| interface IGenDebuggerMonitor : IDispatch<br>{<br>    // Debug events<br>    HRESULT OnDebugPreStartTarget( );<br>    HRESULT OnDebugPostStartTarget(<br>        [in] DWORD dwProcessID,<br>        in] DWORD dwThreadID);<br>    HRESULT OnDebugPreStopTarget([in] DWORD dwProcessID);<br>    HRESULT OnDebugPostStopTarget([in] DWORD dwProcessID);<br>    // Defect reporting<br>    HRESULT OnDebugEvent([in] IEventProperties * pDefect);<br>}; |

An IGenHangMonitor callback interface is defined in Table 6.

TABLE 6

| IGenHangMonitor |
|---|
| interface IGenHangMonitor : IDispatch<br>{<br>    // Hang monitor events<br>    HRESULT OnHangMonitorStart( );<br>    HRESULT OnHang([in] IEventProperties * pDefect);<br>    HRESULT OnHangMonitorShutDown( );<br>}; |

An IGenTimeoutMonitor callback interface is defined in Table 7.

TABLE 7

IGenTimeoutMonitor

```
interface IGenTimeoutMonitor : IDispatch
{
    // Timeout monitor events
    HRESULT OnTimeoutMonitorStart( );
    HRESULT OnTimeout([in] IEventProperties * pDefect);
    HRESULT OnTimeoutMonitorShutDown( );
};
```

An IGenWindowsMonitor callback interface is defined in Table 8.

TABLE 8

IGenWindowsMonitor

```
interface IGenWindowsMonitor : IDispatch
{
    HRESULT OnWindowsMonitorInit( );
    HRESULT OnWindowOpened([in] IEventProperties * pDefect);
    HRESULT OnWindowsMonitorShutDown( );
};
```

An IGenServiceLogMonitor callback interface is defined in Table 9.

TABLE 9

IGenServiceLogMonitor

```
interface IGenServiceLogMonitor : IDispatch
{
    HRESULT OnServiceLogMonitorStart( );
    HRESULT OnServiceLogEvent([in] IEventProperties * pEvent);
    HRESULT OnServiceLogMonitorShutdown( );
}
```

An IEventProperties interface is defined in Table 10.

TABLE 10

IEventProperties

```
interface IEventProperties : IDispatch
{
    // Number of properties
    HRESULT CountProperties([out, retval] DWORD * pcProperties);
    // Property informations
    HRESULT GetPropertyInfo([in] DWORD iProperty,
            [out, retval] IPropertyInformation ** ppPInfo);
    // Acquire a property value from the bag
    HRESULT Read([in] IPropertyInformation * pPInfo,
        [out, retval] VARIANT * pvarValue);
};
```

An IPropertyInformaton interface is defined in Table 11.

TABLE 11

IPropertyInformaton

```
interface IPropertyInformation : IDispatch
{
    // Number of properties
    HRESULT PropertyType([out, retval] DWORD * pdwPropType);
    HRESULT VarType([out, retval]    DWORD * pdwVarType);
    HRESULT ClipFormat([out, retval]    DWORD * pdwClipFormat);
    HRESULT PropName([out, retval]    BSTR * pStrPropName);
    HRESULT PropCLSID([out, retval]    CLSID * pCLSID);
};
```

An IEventFilter interface is defined in Table 12.

TABLE 12

IEventFilter

```
interface IEventFilter : IDispatch
{
    // Query the user provided component for instructions
    HRESULT ShouldReportWindow(
        [in] IEventProperties * pWindowEventProperties,
        [in, out] VARIANT_BOOL * pfShouldReport,
        [in, out] VARIANT_BOOL * pfCreateStackTrace,
        [in, out] VARIANT_BOOL * pfCreateMiniDump);
};
```

An ICustomEventSource interface is defined in Table 13.

TABLE 13

ICustomEventSource

```
interface ICustomEventSource: IDispatch
{
    HRESULT Probe((([in] IEvent Source *pSrc,
        [in] IMonitorsProperties * pProps,
        [out, retval] VARIANT_BOOL * pVarBool);
    HRESULT Load([in] IEvent Source *pSrc,
        [in] IMonitorsProperties * pProps);
    HRESULT Unload( );
    HRESULT SetCallback([in] ICustomEventMonitor * pCallback);
    HRESULT RevokeCallback( );
    HRESULT OnStart( );
    HRESULT OnStop( );
};
```

The IEventSource interface is defined in Table 14 below.

TABLE 14

```
interface IEventSource: IDispatch
{
    HRESULT EnumCustomSources([out, retval] IEnumVARIANT **
    ppEnum);
    HRESULT EnumRunningCustomSources([out, retval]
    IEnumVARIANT ** ppEnum);
};
    interface ICustomEventMonitor : IDispatch
{
    HRESULT OnCustomEventInit([in] GUID guid);
    HRESULT OnNotifyCustomEvent ((([in] GUID guid, [in]
    IEventProperties * pDefect);
    HRESULT OnCustomEventShutDown([in] GUID guid);
};
```

The following constants in Tables 15-21 are used in reporting events via the IEventProperties interface.

TABLE 15

Universal Property IDs

```
EVENT_TYPE =            "EVENT_TYPE";
EVENT_DESCRIPTION =     "EVENT_DESCRIPTION";
PROCESS_ID =            "PROCESS_ID";
THREAD_ID =             "THREAD_ID";
STACK_TRACE =           "STACK_TRACE";
TARGET_CMD_LINE =       " TARGET_CMD_LINE";
MINIDUMP_FILE_NAME =    " MINIDUMP_FILE_NAME";
```

TABLE 16

Hang Monitor Constants

Property IDs
HANG_TIMEOUT_VAL = "HANG_TIMEOUT_VAL";
 Property Data
HANG_EVENT_TYPE    = "HANG_EVENT_TYPE";
  HANG_REPORT_STRING HANG_EVENT_DESCRIPTION
  ="The process window did not respond to SendMessageTimeout within the specified interval.";

TABLE 17

Timeout Monitor Constants

Property IDs
TIMEOUT_VAL =                          "TIMEOUT_VAL";
Property Data
TIMEOUT_EVENT_TYPE =                   "TIMEOUT_EVENT_TYPE";
TIMEOUT_EVENT_DESCRIPTION =            "The startup/shutdown sequence did not signal completion within the allotted interval.";

TABLE 18

Debugger Monitor Constants

Property IDs
EXCEPTION_CODE =              "EXCEPTION_CODE";
FILE_NAME =                   "FILE_NAME";
OUTPUT_DEBUG_STRING =         "OUTPUT_DEBUG_STRING";
RIP_STRING =                  "RIP_STRING";
EXCEPTION_ADDR =              "EXCEPTION_ADDRESS";
FIRSTCHANCE =                 "FIRST_CHANCE";
Property Data
DEBUGGER_EVENT_TYPE =         "DEBUGGER_EVENT_TYPE";
DEBUGGER_EVENT_DESCRIPTION =  "A debug event was generated by the monitored processes.";
Property Data 2, Exception Types
EXCEPTION_EVENT =             "EXCEPTION_EVENT";
CREATEPROCESS_EVENT =         "CREATE_PROCESS_EVENT";
EXITPROCESS_EVENT =           "EXIT_PROCESS_EVENT";
CREATETHREAD_EVENT =          "CREATE_THREAD_EVENT";
EXITTHREAD_EVENT =            "EXIT_THREAD_EVENT";
LOADDLL_EVENT =               "LOAD_DLL_EVENT";
UNLOADDLL_EVENT =             "UNLOAD_DLL_EVENT";
RIP_EVENT =                   "RIP_EVENT";
OUTPUTDEBUGSTRING_EVENT =     "OUTPUT_DEBUG_STRING_EVENT";

TABLE 19

Windows Monitor Constants

Property IDs
WINDOW_CLASS =                "WINDOW_CLASS";
WINDOW_CAPTION =              "WINDOW_CAPTION";
WINDOW_MODULE_FILE_NAME =     "WINDOW_MODULE_FILE_NAME";
WINDOW_HANDLE =               "WINDOW_HANDLE";
Property Data
WINDOWMON_EVENT_TYPE =        "WINDOWMON_EVENT_TYPE";
WINDOWMON_EVENT_DESCRIPTION = "A new window has come to the foreground.";

TABLE 20

Service Event Monitor Constants

Property IDs
 SERVICEMON_TIMEGENERATED =   "TIMEGENERATED"
 SERVICEMON_TIMEWRITTEN =     "TIMEWRITTEN"
 SERVICEMON_EVENTID =         "EVENTID"
 SERVICEMON_EVENTTYPE =       "EVENTTYPE"
 SERVICEMON_EVENTCATEGORY =   "EVENTCATEGORY"
 SERVICEMON_SOURCENAME =      "SOURCENAME"
 SERVICEMON_COMPUTERNAME =    "COMPUTERNAME"
 SERVICEMON_STRINGS =         "STRINGS"
 SERVICEMON_DATA =            "DATA"
Property Data
 SERVICEMON_EVENT_TYPE =      "SERVICE_LOG_EVENT_TYPE"
 SERVICEMON_EVENT_DESCRIPTION = "The service event log has been updated."

TABLE 21

Custom Event Source

Figure 3:
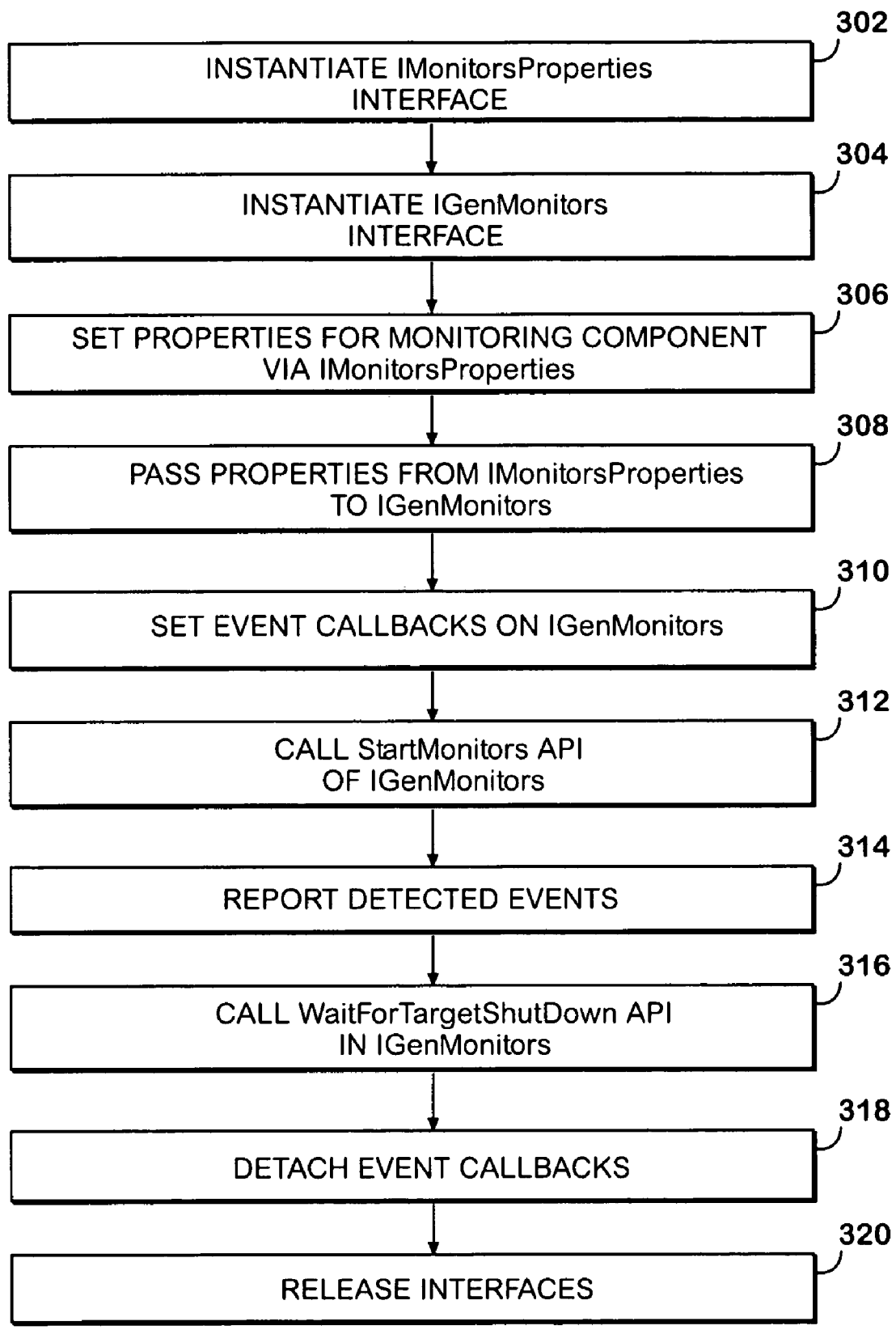
FIG. 3 shows the operational flow for implementing one embodiment of the monitoring component.

Properties IDs
CUSTOM_EVENT_GUID = "CUSTOM_SOURCE_GUID";
CUSTOM_EVENT_FATAL = "CUSTOM_SOURCE_FATAL";
CUSTOM_EVENT_STRING = "CUSTOM_SOURCE_STRING";

In review of the detail implementation discussed above, the basic steps of operation of the instantiated Generic Monitoring module 200 are shown in FIG. 3. A client program, such as but not necessarily an instance of the Remote Monitor Local Server module 128 of FIG. 1, which accesses the exposed interfaces of the instantiated module 200 calls upon the module 200 to instantiate the IMonitorsPropertiesInterface 220 of component 204 at instantiation operation 302. The client also calls upon the module 200 to instantiate the IGenericMonitors Interface 222 of component 202 at instantiation operation 304. At this time, the IUIMonitors Interface 232 may also be instantiated if desired. Thereafter, the client program sets properties for the monitoring component 202 (and component 206 if instantiated) via the IMonitorsProperties Interface 220 at properties operation 306. As discussed above, setting properties includes, among other things, selecting which monitors of the monitoring component 202 should be activated and which target the activated monitors should create and/or attach to for monitoring.

Once the properties for the instance of the monitoring module 200 have been set in IMonitorsProperties Interface 220, the properties are passed to the IGenericMonitors Interface 222 at properties operation 308. The client program sets the event callbacks (e.g., the connection points 224-230) on the IGenericMonitors Interface 222 at interface operation 310 so that the detected events of each monitor may be reported to the client by the event handling mechanism. The client program then calls the StartMonitors API for the IGenericMonitors Interface 222 at start operation 312, which triggers the activated monitors to begin monitoring the specified target.

Once the selected monitors have started and begin to detect events, the detected events are reported through the appropriate callbacks at event operation 314. Once the client program has determined that monitoring need not continue, such as because the target has terminated, it calls the WaitForTargetShutdown API of the IGenericMonitors Interface 222. The client program then detaches the event callbacks previously set for the IGenericMonitors Interface 222 at detach operation 318, and releases the interfaces of the components 202 and 204 (and 206 if instantiated) at release operation 320 such as through ordinary COM procedures.

Figure 4:
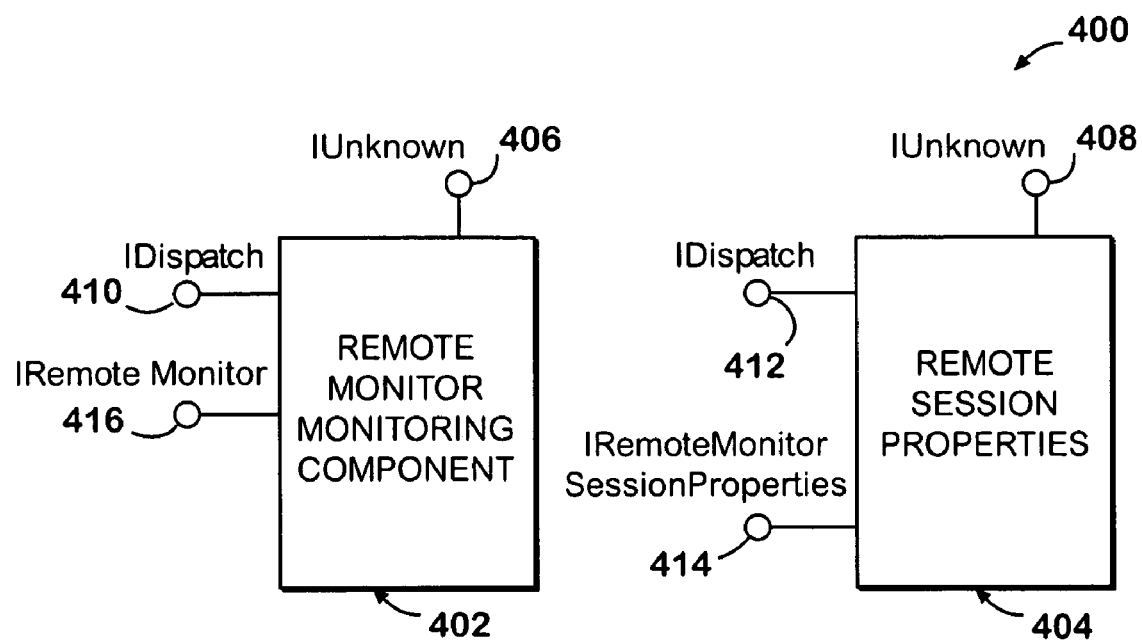
FIG. 4 shows the components of a Remote Monitoring module including the Remote Monitoring component that consolidates control for the multiple monitoring components.
Figure 5:
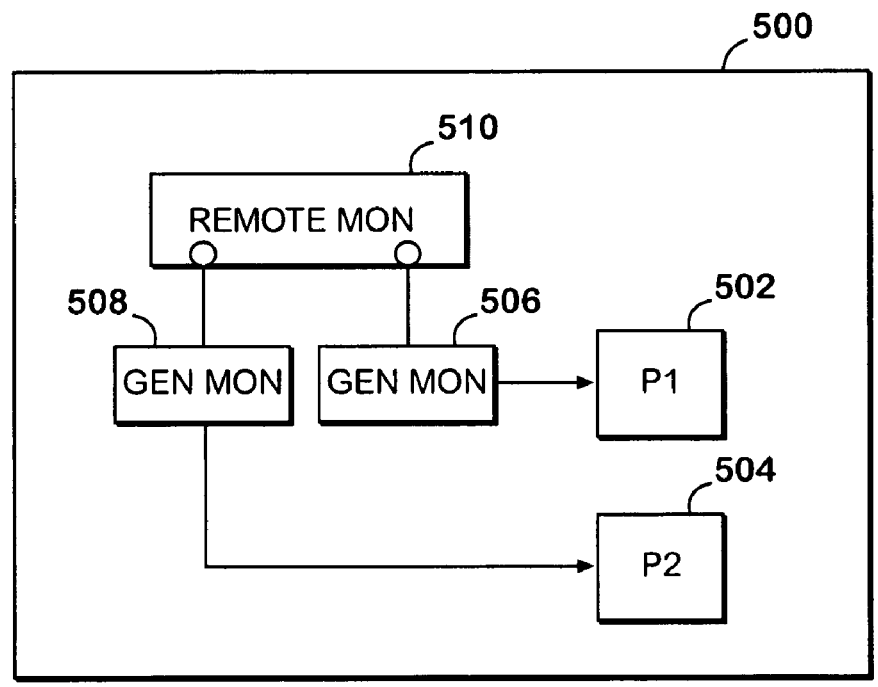
FIG. 5 is a diagram illustrating monitoring of multiple processes using multiple monitors being controlled by a Remote Monitor component.

In FIG. 4, components of one embodiment 400 of the Remote Monitor Local Server module 128 of FIG. 1 are shown, and module 400 is the means by which a remote client such as personal computer 102 can control multiple instances of the Generic Monitor module 200 of FIG. 2 from a single point of control. The instantiated Remote Monitor Local Server module 400 exposes two interfaces to the client in addition to the IUnknown interfaces 406, 408 and IDispatch interfaces 410 and 412. These two interfaces include the IRemoteSessionProperties interface 414 of the Remote Session Properties component 404 and the IRemoteMon interface 416 of the Remote Monitor Local Server component 402.

The Remote Session Properties component 404 and associated interface 414 are analogous to the Generic Monitors Properties component 204 and associated interface 220 described above with reference to FIG. 2. Through component 204 and interface 220, the client sets the properties of an instance of Generic Monitor monitoring of module 200 of FIG. 2.

The Remote Monitor Local Server component 402 and interface 416 provides the mechanism through which the client instantiates multiple instances of the Generic Monitoring module 200, and controls these instances of the Generic Monitoring module 200, and receives notifications of monitored events. Instances of the Generic Monitoring module 200 are instantiated by creating a 'session' through the IRemoteMon interface 416. This is done by providing the Remote Monitor Local Server module 400 with the Remote Session Properties component 404 and associated interface 414. A session refers to a set of properties and one instance of the Generic Monitors that are to be associated with those properties.

The Remote Monitor Local Server module 400 will verify the consistency of the properties the client has set through the Remote Session Properties component 404 and interface 414. Upon acceptance, the Remote Monitor Local Server module 400 will create an instance of the Generic Monitor module 200 and provide the client defined properties to the instantiated Generic Monitor module 200 through the IMonitorsProperties interface 220. Upon success, the Remote Monitor Local Server component 402 and associated interface 416 will return a unique 'session' identifier to the client through which the client can terminate this 'session' at a later time.

A Remote Monitor Local Server module 400 client can set callback hooks through the Remote Monitor Local Server component 402 and interface 416. This is analogous to the callback hooks the client can set to the monitoring component 202 through the IGenMonitors interface 222. However, these callbacks are not forwarded directly from the instance of the monitoring component 202 associated with any session. The Remote Monitor Local Server component 402 hooks its own callbacks into each session of the monitoring component 202 that it creates. When it receives an event from the monitoring component 202, these events are handled (e.g., in the case of window events the window information is read and the window is dismissed), repackaged, and then the information is forwarded to the client via the callback hook.

The client has the ability to connect optional event handlers to an instance of the Remote Monitor Local Server component 402. Event handlers are distinct from event filters. The latter are used by the Generic Monitors to decide whether or not to continue gathering information about a monitored event and report that event to the client of that specific Generic Monitors component. On the other hand, event handlers are used by the Remote Monitor Local Server to modify event information and decided whether or not to report the event to its client. When the Remote Monitor Local Server component 402 is instantiated, one of its first tasks will be to check the system to see if the client has registered an event handler. If so, the event handler will be loaded into the process. When the monitoring component 202 notifies the Remote Monitor Local Server component 402 of an event, the Remote Monitor Local Server component 402 can query the optional event handler to verify whether or not a defect should be reported back to the client of the Remote Monitor Local Server component 402. The optional event handler can modify the event notification structure of the Remote Monitor Local Server component 402 before the client is notified of the event. This is a source filtering feature. When the filter alters the event information it receives by adding or removing data, it is called an active filter.

FIG. 5 shows a computer 500, such as the personal computer 102 of FIG. 1, that is performing two processes 502 and 504. An instance 510 of the Remote Monitor Local Server module 400 exists and controls two instances 506 and 508 of the Generic Monitor module 200. The first instance of the Generic Monitor module 200 includes an instance of the monitoring component 202 which attaches to and/or creates the first process 502 and begins monitoring based on which of the five monitors have been activated. Similarly, the second instance of the Generic Monitor module 200 includes an instance of the monitoring component 202 which attaches to and/or creates the second process 504 and begins monitoring.

Events that are detected by either instance of the monitoring component 202, if allowed by the event handler, are reported to the instance 510 of the Remote Monitor Local Server module 400. The Remote Monitor Local Server 510 then applies any additional filtering, if applicable, and reports the remaining events to the client. The events being reported by each instance of the monitoring component 202 provides the process ID to the Remote Monitor Local Server 510. The Remote Monitor Local Server 510 tracks the session ID assigned to each instance of the monitoring component so that the process ID and session ID for a detected event can be reported to the client, along with a time stamp for the detected event and an identification of what the detected event is (e.g., an exception caught by the debugger monitor).

The following is a detailed implementation of the Remote Monitor Local Server module 400 in COM using the Windows® API. However, one skilled in the art will recognize that different COM implementations are possible and that implementations using different frameworks allowing the implementation of software in terms of components are possible as well. Therefore, as with the Generic Monitoring module detailed implementation discussed above, the following detailed implementation is intended as an example only, and not as a limitation.

The Remote Monitor Local Server module 400 receives session parameters via the IRemoteMonSessionProperties interface 414. What follows is a detailed explanation of these properties and how they are used by the Remote Monitor Client module 700 discussed below with reference to FIGS. 7-9.

The Remote Monitor Local Server module 400 uses all of the properties associated with the IMonitorsProperties interface defined above in the description of the generic monitoring component. These properties are used to initialize an IMonitorProperties interface and set the operating parameters for an instance of the monitoring component controlled by each session. However, the IRemoteMonSessionProperties also exposes a number of properties that affect the Remote Monitor Local Server component's operation. These are described below.

A StartupScript property is used to run a program before the application under test is started. This property is a BSTR that contains a script to be interpreted by the command line interpreter specified on the target application's platform by the "ComSpec" environment variable. By default, this property is NULL.

A ShutdownScript property is also a BSTR, and it also contains a script that can be interpreted and executed by the command line interpreter specified on the target application's platform by the "ComSpec" environment variable. This script is run immediately before the Generic Monitoring component 202 is instructed to either 1) DetachFromRunning Process, 2) WaitForTargetShutdown, or 3) TerminateTarget. By default, this property is NULL.

An EventHandlerID (RW) property is also utilized. In order to allow a client of the Remote Monitor Local Server package a means of customizing event notifications sent via the Remote Monitor Local Server component 402 to the user, the Remote Monitor Local Server component 402 can be instructed to use any component that exposes the IRemoteEventHandler interface. This property specifies the CLSID or ProgID of the component which exposes this interface. The Remote Monitor Local Server component 402 will instantiate an instance of this interface per session, and attach it to the Generic Monitor's event handler for event notification. This interface is responsible for instructing the Remote Monitor Local Server component 402 of whether or not to report the event notification to the client.

Implementation and use of a custom event handler is discussed in more detail below. The default value of this property is NULL. A null ID instructs the Remote Monitor Local Server component 402 not to load or use a custom event handler. Instead, the Remote Monitor Local Server component 402 only relies on its own default event handling mechanism. Further details of default event handling are also discussed in more detail below.

The instantiated Remote Monitor Local Server module 400 is designed to be a single point of entry on a remote machine for a client to control multiple instances of the Generic Monitor module 200 to monitor target applications running on the same system The Remote Monitor Local Server module 400 is running on. The Remote Monitor Local Server module 400 of this illustrative detailed implementation is a local server, designed to communicate with its client through DCOM.

The normal means of usage is for the client to instantiate the Remote Monitor Local Server module 400 on the target system by a call to a CoCreateInstanceEx API. A successful call to this API insures that the instantiated Remote Monitor Local Server 400 and Generic Monitor 200 exist on the target system. After the client has retrieved the IRemoteMon interface 416 from the target system, he then retrieves the IRemoteSessionProperties interface 414.

After setting the operating parameters for an instance of monitoring via the IRemoteSessionProperties interface 414, the client creates a session on the remote machine via the IRemoteMon::CreateSession method. This method takes the IRemoteSessionProperties interface 414 as a parameter and returns a cookie that the client may use at a later time to end the session on the target system. Ending a session on the target system is done via the IRemoteMon::EndSession method.

Control methods affect all the sessions on a target system. These methods are IRemoteMon::StartMonitors, IRemoteMon::ShutdownMonitors, and IRemoteMon::TerminateRemoteSessions. The exact actions taken by Remote Monitor Local Server 400 as a result of invoking these methods are explained in their descriptions below.

The client is notified of monitoring events via a callback mechanism. The client sets a callback on the remote system by calling the IRemoteMon::SetCallback method with a pointer to an instance of an IRemoteMonCallback interface. If, at a later time, the client wishes to set a different callback he can call this same method with a different instance of a callback interface. A call to RemoveCallback operates the same as a call to SetCallback with a NULL value for the interface pointer.

What follows is a detailed explanation of the methods available through the IRemoteMon interface 416. A Start-Monitors method is available, and a call to this method will result in a call to IGenMonitors::StartMonitors on each of the sessions that the instantiated Remote Monitor Local Server 400 controls. Failure to start monitoring any session will result in the execution of the shutdown script and a call to IGenMonitors::Terminate for any session that has already begun. This has the effect of leaving the target machine in the state that it was before any monitors have begun monitoring. Only once all sessions have successfully begun monitoring their target applications will this method return success.

A ShutdownMonitors method is available, and a call to this method will result in the execution of shutdown scripts and a call to IGenMonitors::WaitForTargetShutdown (or IGenMonitors::DetachFromRunningProcess if the operating parameters specify that the session is to monitor a running process) for each session that has been created on the instantiated Remote Monitor Local Server 400. If AttachToRunningProcess is specified as VARIANT_FALSE, then RemoteMon::StopMonitors calls IGenMonitors::WaitForTargetShutdown. The latter method will not return until the target being monitored has exited. Thus it is necessary to have insured that the monitored process will shutdown or else this method can fail with a timeout event being reported. Insuring that you target shuts down is usually done by providing a shutdown mechanism that is executed by the Shutdown Script or by calling RemoteMon::TerminateProcesses.

A TerminateProcesses method is available, and this call terminates the processes associated with every session. If, for some reason, RemoteMon::TerminateProcesses fails to terminate a process, this will be reported by an HRESULT value. However, the Remote Monitor Local Server component 402 will continue attempt to terminate all the processes even if a few of them fail to terminate.

A CreateSession method is available, and by providing this method with the operating parameters (IRemoteMonSessionProperties interface 414 ), the user creates a session with this method. This method results in the following actions being taken by the Remote Monitor Local Server component 402. The session's properties are added to internal table, and if this is the first session created on the target system, Remote Monitor Local Server component 402 will instantiate an instance of Generic Monitor Properties component 204. The property interface returned by this action is then cached for use by latter sessions. Remote Monitor Local Server component 402 then instantiates a new instance of the Generic Monitor module 200, and sets its operating parameters with those provided by the IRemoteMonSessionProperties interface 414. If the session property EventHandlerID is non-NULL, Remote Monitor Local Server component 402 instantiates a new instance of the event handler provided by the user. Remote Monitor Local Server component 402 then creates a new internal event handler and calls IGenMonitors::AttachEvent, providing the internal event handler to the instantiated Generic Monitor module 200. Upon failure of any of these steps, the internal structure of the instantiated Remote Monitor Local Server module 400 is returned to its state before the call to CreateSession. Upon success, CreateSession will return a unique identifier (session cookie) that the user can use to end this session in the future.

The arguments for Create Session are as follows:
IRemoteSessionProperties—A Pointer to a IRemoteSessionProperties interface which has been initialized with the operating parameters for one monitoring session.
DWORD dwCookie—A Pointer to a DWORD to receive the session cookie.

The EndSession method is provided and allows the client to end a session by passing in the cookie returned through CreateSession, but this can only be done while the monitors are not running. When this method is called, Remote Monitor Client 700 takes the following steps. First, the cookie is validated such that if it does not match to a current session, CONNECT_E_NOCONNECTION is returned. The session is then removed from the internal table of sessions, the cookie is invalidated, and any further attempts to use this cookie will result in a CONNECT_E_NOCONNECTION error. The internal event handler is detached from the instance of the Generic Monitor module 200 associated with this session, and then the Generic Monitor instance 200 related to this session is released. If the EventHandlerID property associated with this session is non-null, the user defined event handler is then released. The EndSession method will always succeed when the cookie provided is valid and the monitors are not running. The arguments of EndSession are as follows:
DWORD dwCookie—DWORD containing the cookie for the session to remove.

A SetCallback method is provided, and the client provides a callback interface for event notification through this interface. The client can set this interface to NULL if the client does not wish to receive event notifications from the monitoring sessions controlled by the instantiated Remote Monitor Local Server module 400. The arguments for SetCallback are as follows:
IRemoteMonCallback—A Pointer to an interface that will be called back with event information. A RevokeCallback is provided and is identical to calling RemoteMon::SetCallback with a NULL argument.

The Remote Monitor Local Server component 402 packages information received from the session monitors before forwarding that information back to the client through the IRemoteMonCallback interface provided to Remote Monitor Local Server component 402 by the client. There are two layers of event handling that occur in Remote Monitor Local Server component 402 before event information is forwarded to the client. The first is default event handling, which packages information about defects only. If the client provides a valid CLSID for a custom event handler in the session properties, default event handling has no affect on the target application or target system. However, if the user has not provided a valid CLSID for a custom event handler in a session's properties the default event handler will attempt to dismiss windows created by assertion failures on the target. This behavior is fully described in the description of default event handling below.

The second event handling layer occurs in the custom event handler module. This is a mechanism that allows a user of a Remote Monitor Local Server 400 to affect the target system upon reception of an event reported by a session monitor. Secondly, it allows the user of Remote Monitor Local Server 400 to repackage information about the event and provide additional information about the event. Finally, a custom event handler provides a means for a user of Remote Monitor Local Server 400 to control when the client is notified of an event. This behavior is fully described in the description of the custom event handler module below.

The default event handling module of Remote Monitor Local Server component 402 is aware of the structure and contents of event notifications provided by the Generic Monitoring component 200. When the client creates a session on Remote Monitor Local Server 400, the component 402 creates a new instance of the default event handler and provides this to the instance of Generic Monitor component 202 associated with the monitoring session. Upon monitoring an event, Generic Monitor component 202 calls into Remote Monitor Local Server component 402 through this event handler.

The event handler will filter the information provided by Generic Monitor component 202 and initialize an instance of an IRemoteEventInfo interface with this information. For debugging, hang and timeout events, all information needed to initialize the IRemoteEventInfo interface is provided by Generic Monitor component. However, default event handling for UI events can affect the target if the user has not provided a custom event handler for the session that monitored the event.

Upon receiving a window event, the default handler is designed to identify and manipulate window messages that result from assertion failures in the target. If the default event handler recognizes the window as an assertion failure, it will then initialize an instance of IRemoteEventInfo interface with assertion information. Finally, if no custom event handler has been associated with this session, Remote Monitor Local Server component 402 will attempt to dismiss the assertion window. The default event handler retrieves assertion information and dismisses the assertion window as described below.

If a custom event handler has been associated with this session, Remote Monitor Local Server component 402 will provide the custom event handler with an IRemoteEventInfoEx interface through which all defect information packaged by the Remote Monitor Local Server can be read and modified by the custom event handler. For example, through this interface the custom event handler will be provided an IEventProperties interface created by Generic Monitor component 202. This interface can be used by the custom event handler for further processing of event information or to change the information that will be reported back to the Remote Monitor Local Server's controlling program.

Finally, Remote Monitor Local Server component 402 will decide whether or not to forward the event notification to its client. If no custom event handler is present, Remote Monitor Local Server component 402 will only forward event notifications if they are a result of defect notifications. Specifically, in this case event notification will only be forwarded to the client if they are a result of Generic Monitor component 202 calling back to Remote Monitor Local Server component 402 with OnDebugEvent that is an exception, OnHang, OnTimeout, OnServiceLogEvent events that have type event type of EVENTLOG_ERROR_TYPE, or OnWindowOpenend events that it has identified as assertion failures. If a custom event handler has been associated with this session, event notifications are forwarded only if the custom event handler instructs Remote Monitor Local Server component 402 to forward the event via the pfShouldReport argument present in every method in the IEventHandler interface. The structure of the IRemoteEventInfo interface is described below.

A window event is determined to be an assertion failure only if either of the substrings "assert" or "error" appear in the caption of the window that created the OnWindowOpened event reported by Generic Monitor component 202. The case of these strings is not important, since the window title is converted to lower case before substring matching is done. Window text is the text appearing in the static control with id 0xffff. This is the default id of the static control in message boxes and most assert dialog boxes.

The assertion line number and the assertion file are parsed from the window text. The line number is the first number in the window text that appears after the first instance of the substring "line." The assertion file is the module name returned by the Windows® API call::GetWindowModule.

Finally, if no custom event handler has been specified for this session the default event handler will attempt to dismiss an assertion window. This is done by mimicking a user typing ENTER in order to activate the default pushbutton on the assert dialog. For most assert dialogs this corresponds to an interactive user pressing 'IGNORE.'

The IRemoteEventInfo properties are (RW) in the IRemoteEventInfoEx interface provided to the custom event handler. Descriptions of the properties for the RO interface, IRemoteEventInfo, are provided below. Each property is RO in the following description; however, one should note that these same properties are RW in the IRemoteEventInfoEx interface.

The DefectType property returns a WORD value describing the type of event that has been reported. This type is a WORD defined in the Remote Monitor Local Server interface definition. The type is the following values:

| | |
|---|---|
| rtDefectSecondChanceException = | 0, |
| rtDefectFirstChanceException = | 1, |
| rtDefectAssertionFailed = | 2, |
| rtDefectTimeout = | 3 |
| rtDefectHang = | 4 |
| rtServiceLogEvent = | 5 |
| rtOtherEvent = | 6 |

DefectType is an event property that has been set by the default event handler, and the custom event handler can change this type freely. However, if Remote Monitor Local Server module 400 is being used with a Remote Monitor Client module 130 (discussed below with reference to one embodiment 700 of FIG. 7), changes in this type will result in changes in the way this event is prioritized by Remote Monitor Client module 700.

A MachineName (RO) property is used, and the Remote Monitor Local Server module 400 retrieves the value of the MachineName property via reading the COMPUTERNAME environment variable on the machine on which it is running. If this variable is NULL, Remote Monitor Local Server module 400 will then attempt to retrieve this value from the Winlnet gethostname API call. Failure on this API call will result in a NULL machine name. MachineName is an event property that has been set by the Remote Monitor Local Server module 400 and should not be modified by the custom handler.

The CmdLine (RO) is used, and this property returns the CmdLine property that was used to create the session on RemoteMon that produced this event. CmdLine is an event property that has been set by the Remote Monitor Local Server module 400 and should not be modified by the custom handler.

The StackDump(RO) property is an event property that has been set by the Remote Monitor Local Server module 400 and can not be modified by the custom handler. This property may be NULL if the stack dump could not be retrieved. The stack dump may not be available for two reasons. First, the SymbolPath property used to create the session that produced this session is incorrect. Secondly, this is a TimeoutEvent that occurred on target attachment or creation.

AssertionInfo(RO) is a method that returns four pieces of information. The Assertion File is the name of the module that created this event. The Assertion Line is the line number that appears in the assertions title bar. The Assert Caption is the complete title of the assertion window. The Assert Text is the complete text that appears in the assertion window. The AssertionInfo event property that has been set by the Remote Monitor Local Server module 400 and can not be modified by the custom handler. The definition of this method call is as follows:
HRESULT AssertionInfo(
BSTR pstrAssertFile,
DWORD pdwAssertLine,
BSTR pstrAssertCaption,
BSTR pstrAssertText);

The ExceptionInfo (RO) is data that is collected by Remote Monitor Local Server component 402. It consists of three pieces of information. The Exception Code is the DWORD identifier of the debug event. The Exception Address is the address at which the exception was created. The Exception Module is the module that created the exception event. The ExceptionInfo event property is set by the Remote Monitor local Server module 400 and cannot be modified by the custom handler. The definition of this method call is as follows:
HRESULT ExceptionInfo(
DWORD pdwCode,
DWORD pdwAddress,
BSTR pstrModule);

The ExtendedProperties (RO) is a property bag that is controlled by the custom event handler. Remote Monitor Local Server module 400 will not modify this interface in any way. This property can return NULL.

In practice, a client of the Remote Monitor Local Server module 400 is only interested in a subset of the events detected by Generic Monitor module 200. A custom event handler module allows the user to filter these events on the target system and augment the event notification information before the event is reported to the client. In order for Remote Monitor Local Server module 400 to utilize custom event handling, the user must first implement a custom event handler component that exposes the IEventHandler interface defined below. This component must then be registered on the same machine on which Remote Monitor Local Server 400 runs. For each session that is provided with a non-zero EventHandlerID session property, Remote Monitor Local Server 400 will forward event notifications to the IEventHandler exposed by the component identified by the EventHandlerID.

The IEventHandler interface is a concatenation of the five event handlers supported by Generic Monitor component 202; IGenDebuggerMonitor, IGenHangMonitor, IGenTimeoutMonitor, IGenWindowMonitor, and IGenServiceEventMonitor. Each event notification produced by Generic Monitor component 202 is forwarded to the custom event handler after basic default event handling is completed. The method name that is called for the event is the same as the method name on the associated monitor interface called by Generic Monitor component 202. Further, the IEventHandler interface receives all the information provided by Generic Monitor component 202 through these monitor callbacks, including the IEventInfo interface used by Generic Monitor component 202 to describe events it has detected.

Although each method in IEventHandler is derived from exactly one of the methods available to the Generic Monitor component 202 event handlers, each method in IEventHandler is augmented to support two more arguments. The last two parameters of every method of IEventHandler are:
IRemoteEventInfoEx*pEventInfoEx,
VARIANT_BOOL*pfShouldReport The first argument, pEventInfoEx, is an extension of the IRemoteEventInfo interface that was initialized by the default event handler. This extension provides write access to the properties set by the default handler to allow the custom event handler to overwrite any previously set parameters. The second argument, pfShouldReport instructs Remote Monitor Local Server 400 on how to continue after the custom event handler returns. If the custom event handler sets this parameter to VARIANT_TRUE, the client will be notified of this event. If the parameter is set to VARIANT_FALSE then Remote Monitor Local Server 400 will not notify the client of this event.

When the custom event handler is called, the IEventInformation property of pEvetnInfoEx interface is the IEventInfo interface created by the Generic Monitoring component. If user wishes to report to the client more information than is available in the other properties of the IRemoteInfo interface; the user should implement the custom event handler to pass an IEventInfo interface to the IRemoteEventInfoEx::ExtenedProperties property. Alternatively, the custom event handler may simply forward the IEventInfo interface produced by Generic Monitor component 202.

The interfaces defined below for this embodiment of the Remote Monitor Local Server module 400 do not provide the [propput] or [propget] tags on the method as would be included in the MIDL definition of these interfaces. However, it is clear from the context whether or not a method is a property or not and what type of property it is.

The IRemoteSessionProperties interface 414 is defined in Table 22.

TABLE 22

| IRemoteSessionProperties |
| --- |
| interface IRemoteSessionProperties : IDispatch<br>{<br>  // Attach Debugger monitor?<br>  HRESULT AttachDebugMon([out, retval] VARIANT_BOOL * pfAttachDeb);<br>  HRESULT AttachDebugMon([in, defaultvalue(TRUE)]<br>    VARIANT_BOOL fAttachDeb);<br>  // Attach Windows monitor ?<br>  HRESULT AttachWindowsMon([out, retval]<br>    VARIANT_BOOL * pfAttachWin);<br>  HRESULT AttachWindowsMon([in, defaultvalue(TRUE)]<br>    VARIANT_BOOL fAttachWin);<br>  // Attach Hang monitor ?<br>  HRESULT AttachHangMon([out, retval] VARIANT_BOOL * pfAttachHang);<br>  HRESULT AttachHangMon([in, defaultvalue(TRUE)]<br>    VARIANT_BOOL fAttachHang);<br>  // Attach Timeout monitor ?<br>  HRESULT AttachTimeoutMon([out, retval]<br>    VARIANT_BOOL * pfAttachTime);<br>  HRESULT AttachTimeoutMon([in, defaultvalue(TRUE)]<br>    VARIANT_BOOL fAttachTime);<br>  // Attach Service Event Monitor<br>  HRESULT AttachServiceLogMon ([out, retval] VARIANT_BOOL * pfAttach);<br>  HRESULT AttachServiceLogMon ([in, defaultvalue(TRUE)]<br>    VARIANT_BOOL fAttach);<br>  // Timeout Time |

TABLE 22-continued

IRemoteSessionProperties

```
    HRESULT TimeoutTime([out, retval] DWORD * pdwTimeoutTime);
    HRESULT TimeoutTime([in] DWORD    dwTimeoutTime);
    // Hang Time
    HRESULT HangTime([out, retval] DWORD * pdwHangTime);
    HRESULT HangTime([in] DWORD dwHangTime);
    // Startup Script
    HRESULT StartupScript([out, retval] BSTR * pstrScript);
    HRESULT StartupScript([in] BSTR strScript);
    // Shutdown script
    HRESULT ShutdownScript([out, retval] BSTR * pstrScript);
    HRESULT ShutdownScript([in] BSTR strScript);
    // Command line
    HRESULT CommandLine([out, retval] BSTR * pstrCmdLine);
    HRESULT CommandLine([in] BSTR strCmdLine);
    // Symbol path
    HRESULT SymbolPath([out, retval] BSTR * pstrSymbolPath);
    HRESULT SymbolPath([in] BSTR strSymbolPath);
    // Window classes
    HRESULT WndClass([out, retval] VARIANT * pvarWndClass);
    HRESULT WndClass([in] VARIANT strWndClass);
    // Module list
    HRESULT Modules([out, retval] VARIANT * pvarModules);
    HRESULT Modules([in] VARIANT varModules);
    // Working directory
    HRESULT WorkingDir([out, retval] BSTR * pstrWorkingDir);
    HRESULT WorkingDir([in] BSTR strWorkingDir);
    // Attach to a running process ?
    HRESULT AttachToRunning([out, retval] VARIANT_BOOL *
pfAttach);
    HRESULT AttachToRunning([in, defaultvalue(TRUE)]
        VARIANT_BOOL fAttach);
    // Event Handler ID
    HRESULT EventHanlderID([out, retval]    BSTR* pBstrCLSID);
    HRESULT EventHandlerID([in] BSTR        bstrCLSID);
    // Event Filter ProgID (For filtering at the GenMon level)
    HRESULT EventFilterID([out, retval] BSTR * pStrEventFilterID);
    HRESULT EventFilterID([in] BSTR StrEventFilterID);
    // Service Log File Name list
    HRESULT ServiceLogFileName ([out, retval]
VARIANT * pVarLogs);
    HRESULT ServiceLogFileName ([in] VARIANT varLogs);
    // Custom Event Source
    HRESULT CustomEventSourceGUIDs ([out, retval] VARIANT *
pVarClasses);
    HRESULT CustomEventSourceGUIDs
        ([in]     VARIANT    varClasses);
};
```

The IRemoteMon interface 416 is defined in Table 23.

TABLE 23

IRemoteMon

```
interface IRemoteMon : IDispatch
{
    HRESULT StartMonitors( );
    HRESULT ShutdownMonitors( );
    HRESULT TerminateProcesses( );
    HRESULT CreateSession([in] IRemoteSessionProperties * pProps,
        [out] DWORD * dwCookie);
    HRESULT EndSession([in] DWORD dwCookie);
    HRESULT SetCallback([in] IRemoteMonCallback * pCallback);
    HRESULT RevokeCallback( );
};
```

The IRemoteMonCallback interface is defined in Table 24.

TABLE 24

```
IRemoteMonCallback
interface IRemoteMonCallback : IUnknown
{
    HRESULT NotifyRemoteEvent([in]IRemoteEventInfo * pInfo);
};
```

The IRemoteEventInfo interface is defined in Table 25.

TABLE 25

IRemoteEventInfo

```
interface IRemoteEventInfo : IDispatch
{
    HRESULT MachineName([out,        BSTR * pstrMachineName);
retval]
    HRESULT CmdLine([out, retval]    BSTR * pstrCmdLine);
    HRESULT StackDump([out, retval]  BSTR * pstrStackDump);
    HRESULT DefectType([out, retval] WORD * pwType);
    HRESULT AssertionInfo(
        [out] BSTR * pstrAssertFile,
        [out] DWORD * pdwAssertLine,
        [out] BSTR   * pstrAssertCaption,
        [out] BSTR   * pstrAssertText);
    HRESULT ExceptionInfo(
        [out] DWORD * pdwCode,
        [out] DWORD * pdwAddress,
        [out] BSTR   * pstrModule);
    HRESULT ExtendedProperties([out] IEventProperties *
pEventProperties);
};
```

The IRemoteEventInfoEx interface is defined in Table 26.

TABLE 26

IRemoteEventInfoEx

```
interface IRemoteEventInfo : IDispatch
{
    HRESULT DefectType([in])          WORD  wType);
    HRESULT DefectType([out,          WORD * pwType);
retval]
    HRESULT MachineName([in]          BSTR strMachineName);
    HRESULT MachineName([out,         BSTR * pstrMachineName);
retval]
    HRESULT CmdLine([in]              BSTR  strCmdLine);
    HRESULT CmdLine([out, retval]     BSTR * pstrCmdLine);
    HRESULT StackDump([in]            BSTR  strStackDump);
    HRESULT StackDump([out, retval]   BSTR * pstrStackDump);
    // Assertion specific information
    HRESULT AssertFile([in]           BSTR strAssertFile);
    HRESULT AssertLine([in]           DWORD dwAssertLine);
    HRESULT AssertCaption([in]        BSTR strAssertCaption);
    HRESULT AssertText([in]           BSTR strAssertText);
    HRESULT AssertionInfo(
        [out] BSTR  * pstrAssertFile,
        [out] DWORD * pdwAssertLine,
        [out] BSTR   * pstrAssertCaption,
        [out] BSTR   * pstrAssertText);
    // Exception specific information
    HRESULT ExceptionCode([in] DWORD dwCode);
    HRESULT ExceptionAddress([in] DWORD dwAddress);
    HRESULT ExceptionModule([in] BSTR strModule);
    HRESULT ExceptionInfo(
        [out] DWORD * pdwCode,
        [out] DWORD * pdwAddress,
        [out] BSTR   * pstrModule);
    HRESULT ExtendedProperties([in] IEventProperties *
pEventProperties);
    HRESULT ExtendedProperties([out] IEventProperties **
ppEventProperties);
};
```

The IEventHandler interface is defined in Table 27.

TABLE 27

IEventHandler (Custom event handler implemented by the user)

```
interface IEventHandler : IDispatch
{
    // Window Event Handling
    HRESULT OnWindowsMonitorInit(
        [in] IRemoteEventInfoEx * pEventInfoEx,
        [out] VARIANT_BOOL   * pfShouldReport);
    HRESULT OnWindowOpened(
        [in] IEventProperties * pDefect,
        [in] IRemoteEventInfoEx * pEventInfoEx,
        [out] VARIANT_BOOL   * pfShouldReport);
    HRESULT OnWindowsMonitorShutDown(
        [in] IRemoteEventInfoEx * pEventInfoEx,
        [out] VARIANT_BOOL   * pfShouldReport);
    // Debug Event Handling
    HRESULT OnDebugPreStartTarget(
        [in] IRemoteEventInfoEx *,
        [out] VARIANT_BOOL * pfShouldReport);
    HRESULT OnDebugPostStartTarget(
        [in] DWORD dwProcessID,
        [in] DWORD dwThreadID,
        [in] IRemoteEventInfoEx * pEventInfoEx,
        [out] VARIANT_BOOL   * pfShouldReport);
    HRESULT OnDebugPreStopTarget(
        [in] DWORD dwProcessID
        [in] IRemoteEventInfoEx * pEventInfoEx,
        [out] VARIANT_BOOL   * pfShouldReport);
    HRESULT OnDebugPostStopTarget(
        [in] DWORD dwProcessID
        [in] IRemoteEventInfoEx * pEventInfoEx,
        [out] VARIANT_BOOL   * pfShouldReport);
    HRESULT OnDebugEvent(
        [in] IEventProperties * pDefect,
        [in] IRemoteEventInfoEx * pEventInfoEx,
        [out] VARIANT_BOOL   * pfShouldReport);
    // Hang Event Handling
    HRESULT OnHangMonitorStart
        [in] IRemoteEventInfoEx *,
        [out] VARIANT_BOOL * pfShouldReport);
    HRESULT OnHang(
        [in] IEventProperties * pDefect
        [in] IRemoteEventInfoEx *,
        [out] VARIANT_BOOL * pfShouldReport);
    HRESULT OnHangMonitorShutDown(
        [in] IRemoteEventInfoEx *,
        [out] VARIANT_BOOL * pfShouldReport);
    // Timeout Event Handling
    HRESULT OnTimeoutMonitorStart(
        [in] IRemoteEventInfoEx *,
        [out] VARIANT_BOOL * pfShouldReport);
    HRESULT OnTimeout(
        [in] IEventProperties * pDefect
        [in] IRemoteEventInfoEx *,
        [out] VARIANT_BOOL * pfShouldReport);
    HRESULT OnTimeoutMonitorShutDown(
        [in] IRemoteEventInfoEx *,
        [out] VARIANT_BOOL * pfShouldReport);
    // Service Alert Event Handling
    HRESULT OnServiceLogMonitorStart(
        [in] IRemoteEventInfoEx *,
        [out] VARIANT_BOOL * pfShouldReport);
        );
    HRESULT OnServiceLogEvent(
        [in] IEventProperties * pDefect
        [in] IRemoteEventInfoEx *,
        [out] VARIANT_BOOL * pfShouldReport);
    HRESULT OnServiceLogMonitorShutdown(
        [in] IRemoteEventInfoEx *,
        [out] VARIANT_BOOL * pfShouldReport);
}
```

Figure 6:
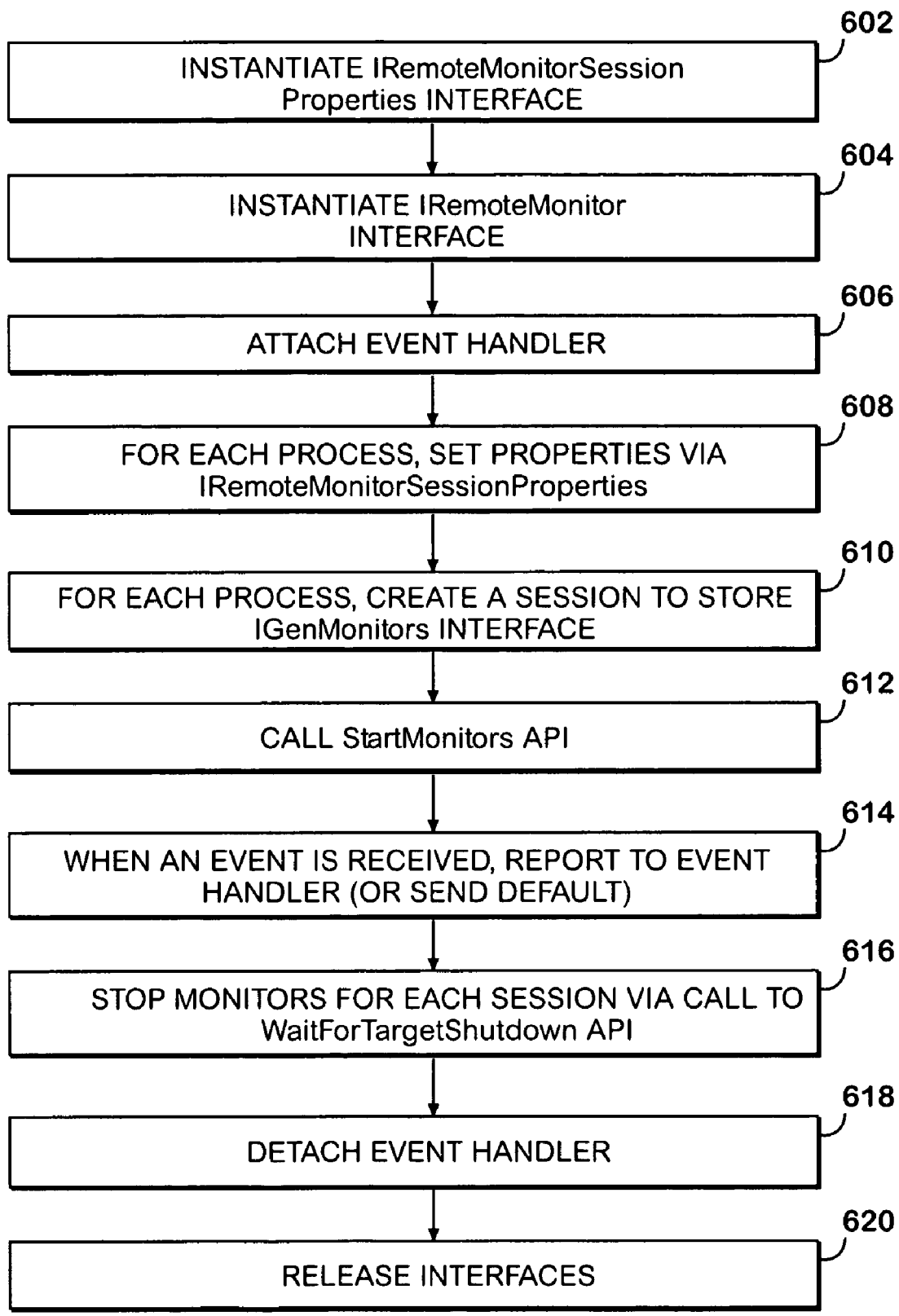
FIG. 6 shows the operational flow for implementing one embodiment of the Remote Monitoring component.

In review of the detailed implementation discussed above, the basic steps of operation of the instantiated Remote Monitor Local Server module 400 are shown in FIG. 6. A client program, such as but not necessarily an instance of the Remote Monitor Client module 130 of FIG. 1, which accesses the exposed interfaces of the instantiated module 200 calls upon the module 400 to instantiate the IRemoteMonitorsSessionPropertiesInterface 414 of component 404 at instantiation operation 602. The client also calls upon the module 400 to instantiate the IRemoteMonitor Interface 416 of component 402 at instantiation operation 604. The event handler for the Remote Monitor Local Server component 402 is attached by the client program at attach operation 606. Thereafter, the client program sets properties for each process to be monitored via the IRemoteMonitorsSessionProperties Interface 414 at properties operation 608. As discussed above, setting properties includes, among other things, selecting which monitors of the instantiated monitoring module 200 for a session should be activated and which target the activated monitors should create and/or attach to for monitoring.

Once the properties for the instance of the Remote Monitor Local Server module 400 have been set in IRemoteMonitorsSessionProperties Interface 414, the properties are passed to the IRemoteMonitors Interface 416, and a session is created for each process to store the IGenericMonitors Interface 222 for the instantiated module 200 at properties operation 610. The client program then calls the StartMonitors API for the IRemoteMonitors Interface 416 at start operation 612, which triggers the activated monitors of each session to begin monitoring the specified target.

Once the selected monitors have started and begin to detect events, the detected events are reported through the appropriate callbacks to the instantiated Remote Monitor Local Server 400, and then the events are reported from the instantiated Remote Monitor Local Server 400 to the event handler in communication with the client program at event operation 614. Once the client program has determined that monitoring need not continue, such as because the target has terminated, it calls the WaitForTargetShutdown API of the IRemoteMonitors Interface 416. The client program then detaches the event handler previously set for the IRemoteMonitor Interface 416 at detach operation 618, and releases the interfaces of the components 402 and 404 at release operation 620 such as through ordinary COM procedures.

Figure 7:
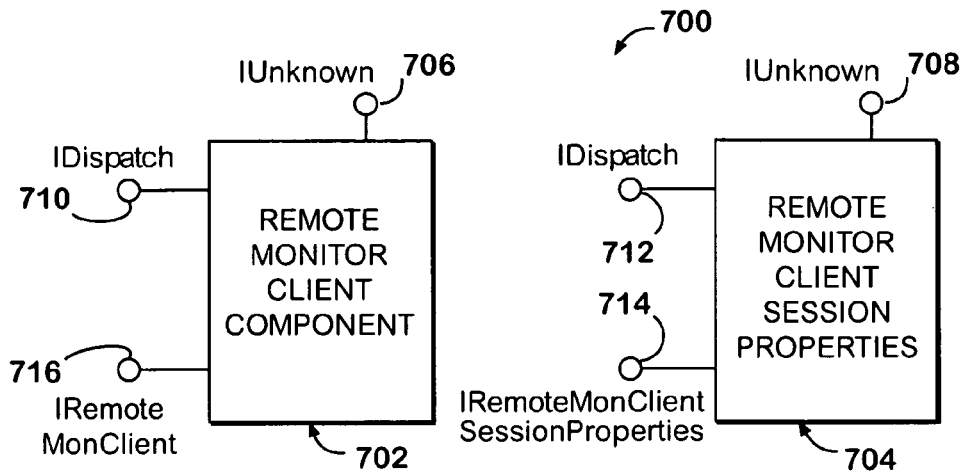
FIG. 7 shows the components of a Remote Monitor Client module including the Remote Monitor Client component that consolidates control for the multiple Remote Monitor components.
Figure 8:
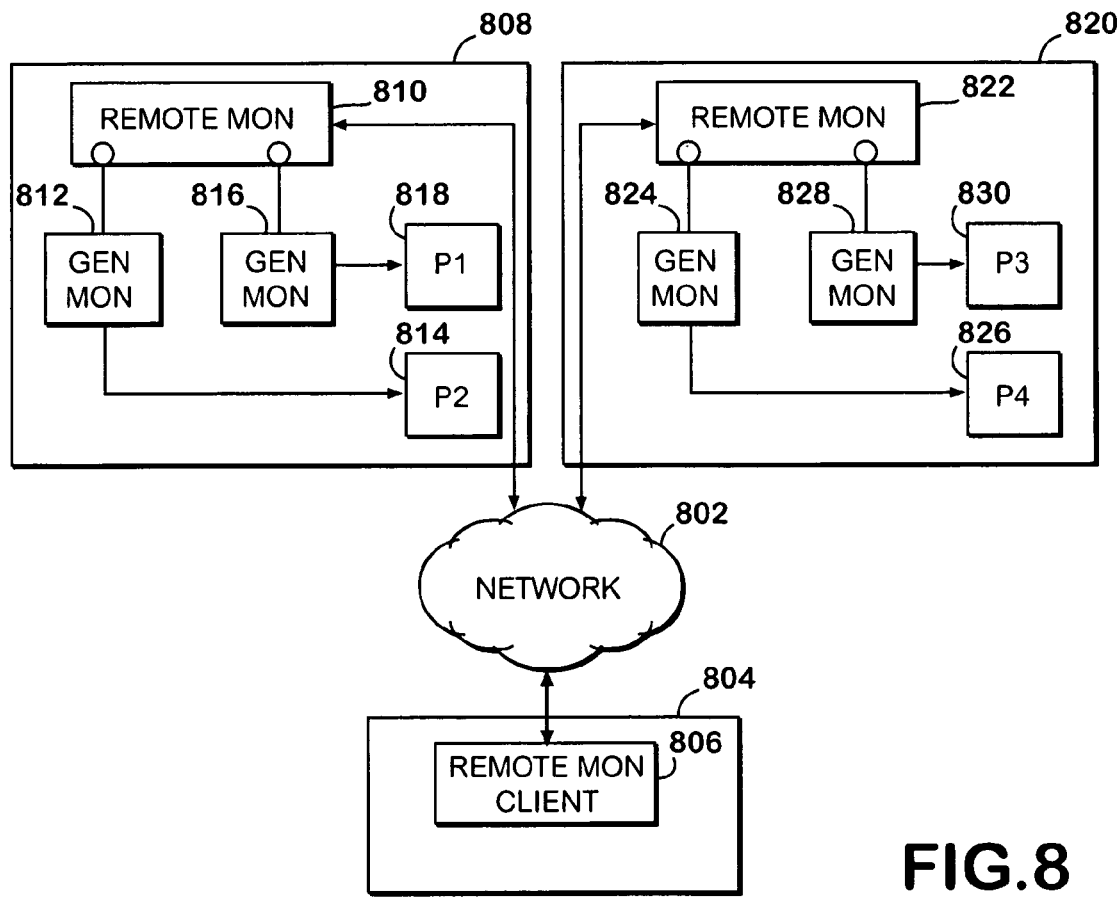
FIG. 8 shows the operational flow for implementing one embodiment of the Remote Monitor Client component.

In FIG. 7, the components of one embodiment 700 of the Remote Monitoring Client module 130 are shown as they occur when instantiated in computer memory 108. As shown, the components are implemented in COM. However, one skilled in the art will recognize that other frameworks allowing the implementation of software in terms of components or combinations of object models are also applicable.

In addition to the well known IUnknown interfaces 706, 708 and the IDispatch interfaces 710, 712, two interfaces are exposed to the client in this embodiment through which the client can control multiple instances of the Remote Monitor Local Server module 400 distributed across a network. These include the IRemoteMonClientSessionProperties interface 714 of the Remote Monitor Client Session Properties component 704 and the IRemoteMonClient interface 716 of the Remote Monitor Client component 702.

The IRemoteMonClientSessionProperties 714 interface is analogous to the IRemoteMonitorSessionProperties interface 414 described above. The client can set properties in computer memory through this interface 714. The properties the client sets are identical to those properties that can be set via the IRemoteMonSessionProperties interface 414 with one additional property. The IRemoteMonClientSessionProperties interface 714 requires an identifier of a machine on which to instantiate an instance of the Remote Monitor Local Server module 400. This identifier can take any form which maps directly to one machine, such as the machine's human readable name or the machines IP address.

Passing this interface 714 to the Remote Monitor Client component 702 via the IRemoteMonClient interface 716 will create a session. A 'session' is an instance of the Remote Monitor Local Server module 400 on a local or a distributed client initialized with the properties set via the IRemoteMonClientSessionProperties interface 714. Upon successful instantiation, a unique identifier is returned to the client. This identifier can be used to end the 'session' at a later time.

'Sessions' with identical machine identity properties do not require instantiating another instance of the Remote Monitor Local Server module 400 on the machine identified by the property. Instead, the instance of the Remote Monitor Client module 700 will reuse a the Remote Monitor Local Server interface retreived from the remote machine when the first 'session' was created.

On creation of a Remote Monitor Local Server 'session', the client will distribute a callback hook to the instance of Remote Monitor Local Server module 400. The instantiated Remote Monitor Local Server 400 will notify the IRemoteMonClient interface 716 of events that it is aware of through this callback. Upon reception of an event notification, the instantiated Remote Monitor Client component 702 will add the event to a table of events it maintains ordered by severity; and further ordered by the time at which the client has received the event notification.

The Remote Monitor Client interfaces 714, 716 are the means by which the client starts, stops, and terminates monitoring on the session previously created. It is also through this IRemoteMonClient interface 716 that the client can query for an ordered enumeration of events of which the instantiated Remote Monitor Client module 700 has received, sorted, and stored.

FIG. 8 shows three networked computers 804, 808, and 820, such as the personal computer 102 of FIG. 1. An instance 806 of the Remote Monitor Client module 700 exists on computer 804 and controls two instances 810 and 822 of the Remote Monitor Local Server module 400. The first instance 810 of the Remote Monitor Local Server module 400 on computer 808 instantiates and controls an instance 816 of the Generic Monitor module 200, which attaches to and/or creates the first process 818 (third process of the distribution) and begins monitoring based on which of the five monitors have been activated for the monitoring component 202 of the monitor 816. Similarly, the first instance 810 of the Remote Monitor Local Server module 400 instantiates and controls an instance 812 of the Generic Monitor module 200 which attaches to and/or creates the second process 814 and begins monitoring.

Similarly, the second instance 822 of the Remote Monitor Local Server module 400 on computer 820 includes an instance 828 of the Generic Monitor module 200, which attaches to and/or creates the first process 830 and begins monitoring based on which of the five monitors have been activated for the monitoring component 202 of the monitor 828. Similarly, the second instance 822 of the Remote Monitor Local Server module 400 includes an instance 824 of the Generic Monitor module 200 which attaches to and/or creates the second process 826 (fourth process of the distribution) and begins monitoring.

Events that are detected by any instance of the Generic Monitoring module 200, if not filtered out by the event handlers, is reported to the instance 810 or 822 of the Remote Monitor Local Server module 400. The Remote Monitor Local Server 810, 822 then applies any additional filtering, if applicable, and reports the remaining events to an instance 806 of the Remote Monitor Client module 700 though the network 802. The events being reported by each monitor 812, 816, 824, or 828 provides the process ID to the Remote Monitor Local Servers 810 or 822. The Remote Monitor Local Servers 810, 822 track the session ID assigned to each monitor so that the process ID and session ID for a detected event can be reported to the Remote Monitor Client 806, along with a time stamp for the detected event and an identification of what the detected event is (e.g., an exception caught by the debugger monitor). The Remote Monitor Client 806 tracks a session ID for each Remote Monitor Local Server 810, 822 so that the session ID of the Remote Monitor Local Server, the session ID of the Generic Monitor 812, 816, 824, or 828, and the process ID for process 814, 818, 826, or 830 may be reported to the client program along with the identification of the event and time stamp.

The following is a detailed implementation of the Remote Monitor Client module 700 in COM/DCOM using the Windows® API. However, one skilled in the art will recognize that different COM/DCOM implementations are possible and that implementations using different frameworks allowing the implementation of software in terms of components are possible as well. Therefore, as with the Generic Monitoring module and Remote Monitor Local Server module detailed implementations discussed above, the following detailed implementation is intended as an example only, and not as a limitation.

The Remote Monitor Client module 700 acts as the single point of control for monitoring several processes across a network. To operate the Remote Monitor Client module 700, the user must first establish at least one session. Remote Monitor Client module 700 receives its operating parameters for a session via the IRemoteMonClientSessionProperties interface 714. Upon reception, the client retrieves an interface to the Remote Monitor Local Server module 400 running on the machine identified by the MachineName property.

If Remote Monitor Client module 700 has already established a connection to an instance of Remote Monitor Local Server module 400 running on the target machine, Remote Monitor Client module 700 will reuse this connection. Otherwise, Remote Monitor Client module 700 will establish a new connection to the remote machine and retreive an IRemoteSessionProperties interface 414 and IRemoteMonitor interface 416. Once these connections have been retrieved, Remote Monitor Client 700 will create a session on the IRemoteMonitor interface 416.

Once a session has been created, the user controls the Remote Monitor Local Servers through the IRemoteMonClient interface 716. This interface allows the user to start, stop, and terminate the operation of the monitors on the local machine or remote machines. The user can remove a running session only when the monitors are inactive. Monitors are inactive if they have never been started, after a successful call to the StopMonitors method, or after a call to the TerminateMonitors method.

At any time, the user can query the IRemoteMonClient interface 716 via an EnumEvents method for events that have been reported by the distributed monitors. Events are stored in memory until either the IRemoteMonClient 716 is unloaded from memory or the user has explicitly removed the events from the component's 702 internal table. Events can be removed via RemoveEvent or RemoveEvents methods available through the IRemoteMonClient interface 716. When the component 702 is shutdown, any session that is currently running is terminated as if the user had called the TerminateMonitors method and all events are removed from memory. Remote Monitor Client module 700 receives session parameters via the IRemoteMonClientSessionProperties interface 714. What follows is a detailed explanation of these properties and how they are used-by Remote Monitor Client module 700.

The MachineName property identifies the machine on which to instantiate an instance of the monitors. The string set via this property is used in the call to CoCreateInstanceEx, and thus must be formatted to fit the specifications of that API call. Machine resources are named using the naming scheme of the network transport. By default, all UNC ("server" or "server") and DNS names ("domain.com", "example.microsoft.com", or "135.5.33.19") names are allowed.

Remote Monitor Client module 700 will not attempt to verify the uniqueness of a machine name when distributing sessions across a network. If MachineNames are identical in two sessions, Remote Monitor Client module 700 will communicate all actions appropriate for those sessions through the same interface to the remote machine. However, if different MachineName properties are specified for two sessions that both ultimately refer to the same machine (e.g. "xy.edu" and "123.45.678.90"), Remote Monitor Client module 700 will not recognize these as sessions on the same remote machine.

The SymbolPath property specifies the location of the symbols for the process to be monitored. This is not a required parameter and can be set to NULL. The CommandLine property specifies the location of the executable to be monitored. As discussed above, since Generic Monitor 200 uses the Win 32 API CreateProcess( . . . ) to start the target, this path must follow the guidelines of that API.

The WorkingDirectory (RW) property specifies the working directory for the process to be monitored. It is sent to CreateProcess without modification. It is a pointer to a null-terminated string that specifies the current drive and directory for the child process. The string must be a full path that includes a drive letter. If this parameter is NULL, the new process will have the same current drive and directory as the calling process. The default value of this property is the directory specified by the "TEMP" environment variable.

The AttachXXXMon properties, TimeoutTime property, HangTime property, WndClasses property, StartupScript property, ShutdownScript property, AttachToRunningProcess property, ModuleList property, EventHandlerID, EventFilterID, and ServiceLogFileName (RW) properties are provided for the Remote Monitor Client module 700. These properties are used as discussed above for the Remote Monitor Local Server module 400. In fact, these properties are used by the Remote Monitor Client to initialize an IRemoteSessionProperties interface on a Remote Monitor Local Server component and then create a session against that component.

The IRemoteMonClient interface 716 is the mechanism by which the user of Remote Monitor Client module 700 creates a session starts the monitoring of the processes specified in the operating parameters of each session, and shuts down the monitoring. What follows is a detailed explanation of the methods and properties of this interface.

The HaveEvent property returns the availability of events in the event queue of the Remote Monitor Client component 702. If there are no events ready to be read, VARIANT_FALSE is returned. If there are any events in the queue, VARIANT_TRUE is returned.

The CreateSession session method is used, and by providing this method with the operating parameters stored in the IRemoteMonClientSessionProperties interface 714 arguments, the user creates a session with this method. This method results in the following actions being taken by Remote Monitor Client module 700. The session is added to internal table index by the remote machine name. If this is the first session created with the MachineName property specified in the operating parameters, the Remote Monitor Client module 700 will instantiate an instance of Remote Monitor Local Server module 400 on the machine specified by the MachineName parameter. The interface returned by this action is then cached for use by later sessions.

If this is the first session created with the MachineName property specified in the operating parameters, Remote Monitor Client module 700 will provide the Remote Monitor Local Server interface with its callback interface. Remote Monitor Client component 700 creates a session on the Remote Monitor Local Server interface related to this machine name. Upon failure of any of these steps, the internal structure of Remote Monitor Client 700 is returned to its state before the call to CreateSession. Upon success, CreateSession will return a unique identifier (session cookie) that the user can use to end this session in the future.

The EndSession method allows the user to end a session by passing in the cookie returned through CreateSession. This can only be done while the monitors are not running. When this method is called, Remote Monitor Client component 700 takes the following steps. The cookie is validated, and if it does not match to a current session, CONNECT_E_NOCONNECTION is returned. The session is removed from the internal table of sessions. The cookie is invalidated, and any further attempts to use this cookie will result in a CONNECT_E_NOCONNECTION error.

If this is the last session with the MachineName property specified for its operating parameters the Remote Monitor Client module 700 callback is revoked from the related Remote Monitor Local Server interface. If this is the last session with the MachineName property specified for its operating parameters, the Remote Monitor Local Server interface associated with this session is release and invalidated for future use by Remote Monitor Client module 700.

The StartRemoteMonitors method is used, and a call to this method will result in Remote Monitor Client module 700 calling StartMonitors on each of the cached Remote Monitor Local Server interfaces that it controls. Failure on any call to Remote Monitor Client module's 700 StartMonitors method will result in calls to. TerminateRemoteProcesses and ShutdownRemoteMonitors on any Remote Monitor Local Server interface that has already been started. Only if all Remote Monitor Local Servers have been started will this method return success.

The ShutdownRemoteMonitors method is used, and a call to ShutdownRemoteMonitors will result in Remote Monitor Client module 700 calling ShutdownMonitors on each of the cached Remote Monitor Local Server interfaces that it controls. If AttachToRunningProcess has not been specified as VARIANT_FALSE, RemoteMon::ShutdownMonitors calls IGenMonitors::WaitForTargetShutdown. The latter method will not return until the target being monitored has closed. Thus it is necessary to insure that the monitored process will shutdown or else this method can fail with a timeout. This is usually done by providing a shutdown method that is executed by the Shutdown Script or calling TerminateRemoteProcesses before calling ShutdownRemoteMonitors.

The TerminateRemoteProcesses method is used, and this call ultimately calls TerminateTarget from the instantiated Generic Monitor module 200 associated with each of the sessions controlled by Remote Monitor Client module 700.

The EnumEvents method is used, and a call to this method will result in an IEnumRemoteEvents interface. IEnumRemoteEvents is an implementation of the well-known IEnumXXX interface. This interface can be used to view all the events that have occurred up to the time the user called this method. The event enumeration is provided to the client already prioritized. First, the events are prioritized by the severity of the remote event. The order of severity from most severe to least severe is second chance exceptions, first chance exceptions, assertion failures, hangs, timeouts, and finally uncategorized events. Remote events with the same severity are arranged by the order they were received by Remote Monitor Client component 702, with the first event being the one received first.

The RemoveEvent method is used, and by providing the IRemoteEventInformation interface for an event, a call to this method will result in that event being removed from Remote Monitor Client component's 702 internal table. This method is provided as a means of allowing the user to store 'interesting' events within Remote Monitor Client component 702 and insuring that a call to EnumEvents is not destructive. When the RemoveEvents method is provided with a pointer to an IEnumRemoteEvents interface, a call to this method will result in all the events in the enumeration being removed from RemoteMonClient component's 702 internal table.

Event Notification is done via the client polling the IRemoteMonClient interface 716 for events. This can be done either by checking the HaveEvent property or by attempting to retrieve an enumeration of events. Information about a remote event is communicated through the IRemoteEventInformation interface.

The DefectType property for the IRemoteEventInformation interface returns a WORD value describing the type of event that has been reported. This type is a WORD defined in the Remote Monitor Local Server interface definition and is discussed above in relation to the Remote Monitor Local Server module 400. The method call definition is provided as follows:

HRESULT DefectType(WORD pwType);

As discussed above, Remote Monitor Local Server 400 retrieves the value of the MachineName property via reading the remote machines COMPUTERNAME environment variable. If this variable is NULL, Remote Monitor Local Server 400 will then attempt to retrieve this value from the Winlnet gethostname API call. Since this value is programmatically retrieved from the remote machine, it may not be identical to the MachineName property specified by the user in the IRemoteMonClientSessionProperties interface 714 used to create a session. The method call definition is provided as follows:

HRESULT MachineName(BSTR pstrMachineName);

The property returns the CmdLine property that was used to create the session on Remote Monitor Local Server 400 that produced this event. This property is identical to the CommandLine property the user set in the IRemoteMonClientSessionProperties 716 used to create the session that created this event. The method call definition is provided as follows:

HRESULT CmdLine(BSTR pstrCmdLine);

As discussed for the Remote Monitor Local Server module 400, the StackDump is an event property that has been set by the Remote Monitor Local Server and cannot be modified by the custom handler. This property may be NULL if the stack dump could not be retrieved. The stack dump may not be available for two reasons. First, the SymbolPath property used to create the session that produced this session is incorrect. Secondly, this is a TimeoutEvent that occurred on target attachment or creation (thus the monitors did not know the Process ID of the process to monitor). The method call definition is provided as follows:

HRESULT StackDump(BSTR pstrStackDump);

The AssertionInfo method returns the four pieces of information discussed above in relation of the Remote Monitor Local Server component 400. The Exception info data collected by Remote Monitor Local Server module 400 consists of three pieces of information also discussed above.

ExtendedProperties is an included property bag that is controlled by the custom event handler such that Remote Monitor Local Server 400 will not modify this interface in any way. The method call definition is provided as follows:

HRESULT ExtendedProperties(IEventProperties pEventProperties);

Remote Monitor Client module 700 of this illustrative detailed implementation is not designed to be started or controlled via DCOM. However, it is designed to instantiate and control DCOM objects on remote machines. In order to receive notification of remote events, it sets a callback hook into the DCOM objects that it instantiates. Thus these DCOM objects must have security privileges to call back into a testing application process. For this reason, CoInitializeSecurity is called, or another manner of allowing the remote machines to callback via the RemoteMon callback interface is provided before loading this component into the testing application's process.

The interfaces defined below for the Remote Monitor Client module 700 do not provide the [propput] or [propget] tags on the method. However, it is clear from the context whether or not a method is a property or not.

The IRemoteMonClientSessionProperties interface 714 is defined in Table 28

TABLE 28

IRemoteMonClientSessionProperties interface IRemoteMonClientProperties: IDispatch
{
// Machine name
    HRESULT MachineName([out, retval] BSTR * pStrMachineName);
    HRESULT MachineName([in, BSTR StrMachineName);
    // Attach Debugger monitor?
    HRESULT AttachDebugMon([out, retval] VARIANT_BOOL * pfAttachDeb);

TABLE 28-continued

IRemoteMonClientSessionProperties

```
HRESULT AttachDebugMon([in, defaultvalue(TRUE)]
                            VARIANT_BOOL fAttachDeb);
// Attach Windows monitor ?
HRESULT Attach WindowsMon([out, retval]
                            VARIANT_BOOL * pfAttachWin);
HRESULT Attach WindowsMon([in, defaultvalue(TRUE)]
                            VARIANT_BOOL fAttachWin);
// Attach Hang monitor ?
HRESULT AttachHangMon([out, retval] VARIANT_BOOL * pfAttachHang);
HRESULT AttachHangMon([in, defaultvalue(TRUE)]
                            VARIANT_BOOL fAttachHang);
// Attach Timeout monitor ?
HRESULT AttachTimeoutMon([out, retval]
                            VARIANT_BOOL * pfAttachTime);
HRESULT AttachTimeoutMon([in, defaultvalue(TRUE)]
                            VARIANT_BOOL fAttachTime);
// Attach Service Event Monitor
HRESULT AttachServiceLogMon ([out, retval] VARIANT_BOOL * pfAttach);
HRESULT AttachServiceLogMon ([in, defaultvalue(TRUE)]
                            VARIANT_BOOL fAttach);
// Timeout monitor timeout
HRESULT TimeoutTime([out, retval] DWORD * pdwTimeOut);
HRESULT TimeoutTime([in] DWORD dwTimeOut);
// Hang monitor timeout
HRESULT HangTime([out, retval] DWORD * pdwTimeOut);
HRESULT HangTime([in] DWORD dwTimeOut);
// Startup script
HRESULT StartupScript([out, retval]      BSTR * pStrStartupScript);
HRESULT StartupScript([in]               BSTR StrStartupScript);
// Shutdown script
HRESULT ShutdownScript([out, retval]     BSTR * pStrStartupScript);
HRESULT ShutdownScript([in]              BSTR   StrStartupScript);
// Target full path
HRESULT CommandLine([out, retval] BSTR * pStrCmdLine);
HRESULT CommandLine([in] BSTR pStrCmdLine);
// Symbols full path properties
HRESULT SymbolPath([out, retval] BSTR * pStrSymPath);
HRESULT SymbolPath([in] BSTR StrSymPath);
// Target working directory full path
HRESULT WorkingDir ([out, retval] BSTR * pStrPath);
HRESULT WorkingDir ([in] BSTR pStrPath);
// Target main window classes
HRESULT WndClasses([out, retval] VARIANT *  pVarClasses);
HRESULT WndClasses([in]          VARIANT    varClasses);
// Target module list
HRESULT ModuleList([out, retval] VARIANT *  pVarModules);
HRESULT ModuleList([in]          VARIANT    varModules);
// Attach to running process ?
HRESULT AttachToRunningProcess([out, retval]
                 VARIANT_BOOL * pfAttachToRunningProcess);
HRESULT AttachToRunningProcess( [in, defaultvalue(TRUE)]
                            VARIANT_BOOL fAttachToRunningProcess);
// Event HandlerID (for use by the Remote Monitor Local Server)
HRESULT EventHanlderID([out, retval]     BSTR * pBstrCLSID);
HRESULT EventHandlerID([in]              BSTR   bstrCLSID);
// Event Filter ProgID (for use by the Generic Monitor component)
HRESULT EventFilterID([out, retval] BSTR * pStrEventFilterID);
HRESULT EventFilterID([in] BSTR StrEventFilterID);
// Service Log File Name list
HRESULT ServiceLogFileName ([out, retval] VARIANT * pVarLogs);
HRESULT ServiceLogFileName ([in] VARIANT varLogs);
// Custom Event Source
HRESULT CustomEventSourceGUIDs ([out, retval] VARIANT * pVarClasses);
HRESULT CustomEventSourceGUIDs ([in]          VARIANT    varClasses);
};
```

The IRemoteMonClient interface 716 is defined in Table 29.

TABLE 29

IRemoteMonClient

```
interface IRemoteMonClientEx : IDispatch
{
    // Session creation
    HRESULT CreateSession([in] IRemoteMonClientSessionProperties *
    pProps,
                              [out] DWORD * dwCookie);
    HRESULT EndSession([in] DWORD dwCookie);
    // Monitor control
    HRESULT StartRemoteMonitors( );
    HRESULT ShutdownRemoteMonitors( );
    HRESULT TerminateRemoteProcesses( );
    // Events
    [propget] HRESULT HaveEvent( [out, retval] VARIANT_BOOL *
    pfHaveEvent);
    [propget] HRESULT EnumEvents([out, retval]
    IEnumRemoteEvents  ** ppEnum);
    HRESULT RemoveEvent( [in] IRemoteEventInformation*
    pRemoteEventInfo);
    HRESULT RemoveEvents([in] IEnumRemoteEvents    * pEnum);
}
```

The IEnumRemoteEvents interface is defined in Table 30.

TABLE 30

IEnumRemoteEvents

```
interface IEnumRemoteEventsEx : IDispatch
{
    HRESULT Next(
        [in]                            ULONG cConnections,
        [out, size_is(cConnections), length_is(*pcFetched)]
                            IRemoteEventInformation ** rgpInfo,
        [out]                           ULONG *pcFetched);
    HRESULT Skip([in] ULONG cConnections);
    HRESULT Reset( );
    HRESULT Clone([out] IEnumRemoteEvents **ppEnum);
};
```

The IRemoteEventInformation interface is defined in Table 31.

TABLE 31

IRemoteEventInformation

```
interface IRemoteEventInformation : IDispatch
{
    HRESULT EventID([out, retval] GUID * puidEventID);
    HRESULT DefectType([out, retval]      WORD * pwType);
    HRESULT MachineName([out, retval]     BSTR *
                                          pstrMachineName);
    HRESULT CmdLine([out, retval] BSTR * pstrCmdLine);
    HRESULT StackDump([out, retval]       BSTR * pstrStackDump);
    HRESULT AssertionInfo(
            [out] BSTR * pstrAssertFile,
            [out] DWORD * pdwAssertLine,
            [out] BSTR * pstrAssertCaption,
            [out] BSTR * pstrAssertText);
    HRESULT ExceptionInfo(
            [out] DWORD * pdwCode,
            [out] DWORD * pdwAddress,
            [out] BSTR * pstrModule);
    HRESULT ExtendedProperties([out] IEventProperties **
    ppEventProperties);
};
```

Figure 9:
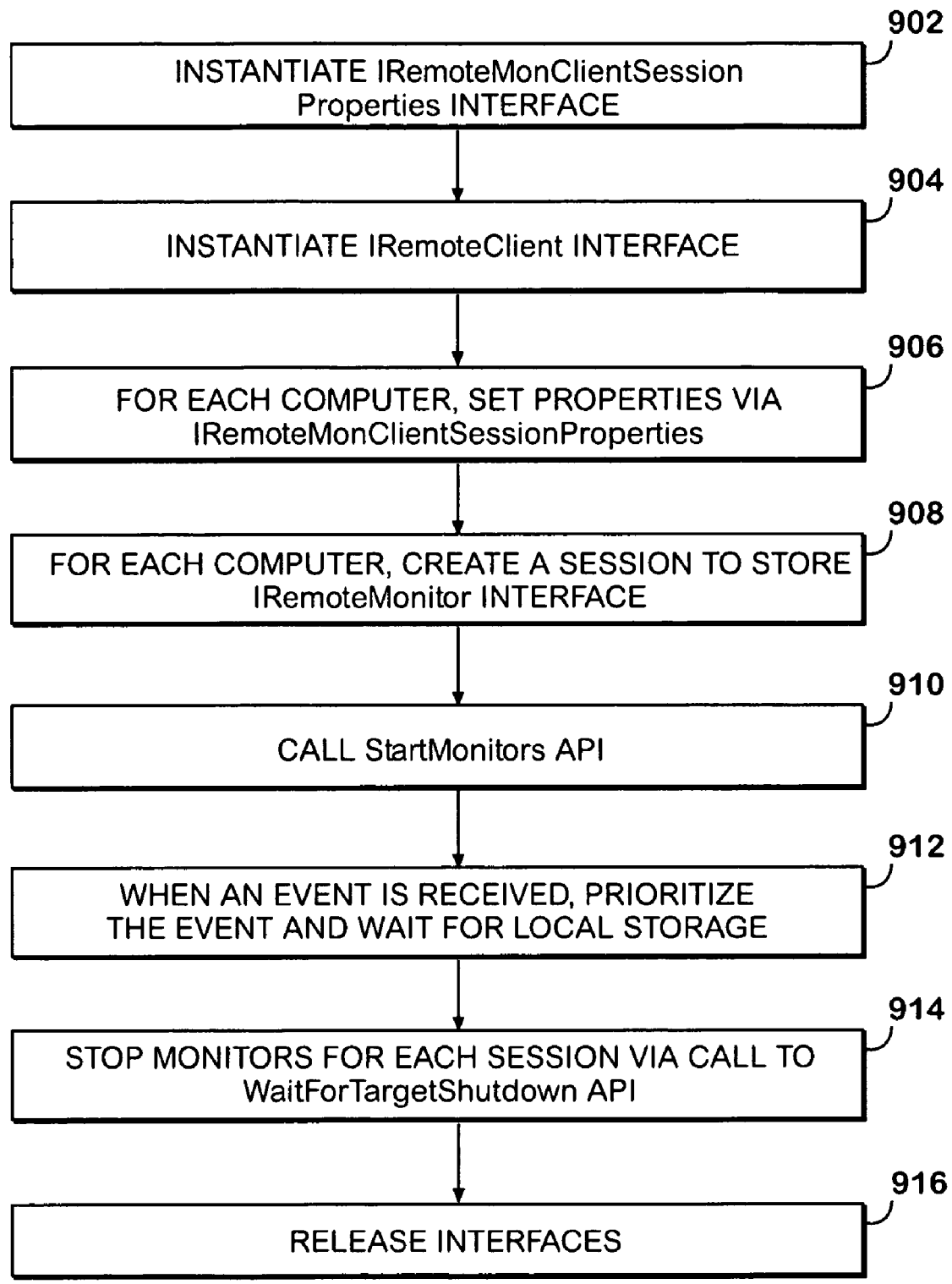
FIG. 9 is a diagram illustrating monitoring of multiple processes distributed among various networked computers using at least one monitor per computer being controlled by a Remote Monitor component for each computer and a Remote Monitor Client controlling the set of Remote Monitor components.

In review of the detailed implementation discussed above, the basic steps of operation of the instantiated the Remote Monitor Client module 700 are shown in FIG. 9. A client program that accesses the exposed interfaces of the instantiated module 700 calls upon the module 700 to instantiate the IRemoteMonClientSessionPropertiesInterface 714 of component 704 at instantiation operation 902. The client also calls upon the module 700 to instantiate the IRemoteMonClient Interface 716 of component 702 at instantiation operation 904. Thereafter, the client program sets properties for each computer having one or more processes to be monitored via the IRemoteMonClientSessionProperties Interface 714 at properties operation 906. As discussed above, setting properties includes, among other things, selecting which monitors of the instantiated monitoring module 200 for a session should be activated and which target the activated monitors should create and/or attach to for monitoring.

Once the properties for the instance of the Remote Monitor Client module 700 have been set in IRemoteMonClientSessionProperties Interface 714, the properties are passed to the IRemoteMonClient Interface 716, and a session is created for each process to store the IRemoteMonitors Interface 416 for the instantiated module 400 at properties operation 908. The client program then calls the StartMonitors API for the IRemoteMonitors Interface 716 at start operation 910, which triggers the activated monitors of each Remote Monitor Local Server session to begin monitoring the specified target.

Once the selected monitors have started and begin to detect events, the detected events are reported through the appropriate callbacks to the instantiated Remote Monitor Local Server 400, and then the events are reported from the instantiated Remote Monitor Local Server 400 to the instantiated Remote Monitor Client 700 at event operation 912. The Remote Monitor Client 700 prioritizes the received events by severity and time and copies them to local storage for later retrieval. Once the client program has determined that monitoring need not continue, such as because the target has terminated, it calls the WaitForTargetShutdown API of the IRemoteMonClient Interface 716. The client program then releases the interfaces of the components 702 and 704 at release operation 916 such as through ordinary COM procedures.

Although the present invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method of monitoring a process running on a computer, comprising:
   instantiating on the computer a monitoring component that provides a set of monitors and at least one interface, wherein the monitoring component is attached to the process to be monitored;
   selectively activating one or more of the monitors from the set when instantiating the monitoring component, wherein each of the one or more monitors is responsive to a particular type of event;
   storing the identification of each activated monitor in a session table as a session;
   detecting events of the process with the one or more monitors that are activated; and
   reporting through the at least one interface an indication of detected events.

2. The method of claim 1, wherein the set includes a service monitor, a debugger monitor, a window monitor, a time-out monitor, and a hang monitor.

3. The method of claim 1, further comprising prior to reporting detected events, storing each detected event in a queue.

4. The method of claim 1, further comprising starting the process to be monitored by specifying a target for the instantiated monitoring component.

5. The method of claim 1, further comprising filtering the detected events based upon at least one criteria prior to reporting detected events, and reporting through the at least one interface the indication of detected events only for the detected events that pass through the filtering.

6. The method of claim 1, wherein detecting events further comprises separately detecting events for each session of the session table.

7. The method of claim 6, wherein reporting further comprises separately reporting detected events for each session of the session table through the interface corresponding to the monitor identified in the session.

8. A monitoring component for a computer, comprising:
at least one interface;
a queue;
a set of selectively activatable monitors through which one or more events of a process are detected, wherein the monitoring component attaches the activated monitors to the process upon instantiation and the activated monitors store indications of the one or more events of the process in the queue;
a session table that stores the identification of each activated monitor as a session; and
an event handler that reports the indications of the one or more events from the queue through the at least one interface.

9. The monitoring component of claim 8, wherein the set of selectively activatable monitors includes a service monitor, a debugger monitor, a time-out monitor, a hang monitor, and a window monitor.

10. The monitoring component of claim 8, wherein the set of selectively activatable monitors are customizable by adding additional monitors through utilization of the at least one interface, specifying a method for the additional monitors in a properties interface associated with the set of selectively activatable monitors, and accepting by the event handler from the queue information generated by the additional monitors.

11. The monitoring component of claim 8, wherein a separate event handler is provided for each session of the session table.

12. A method of monitoring multiple processes of a computer, comprising:
instantiating a remote monitoring component for controlling individual monitoring components, the remote monitoring component having at least one interface;
for each process being monitored under the remote monitoring component, instantiating on the computer an individual monitoring component providing at least one monitor and at least one interface;
for each instantiated individual monitoring component, activating the at least one monitor that is responsive to a particular type of event;
storing the identification of each activated monitor in a session table as a session;
for each process being monitored, detecting events with the at least one monitor of the monitoring component;
when an event is detected by the at least one monitor for a process, reporting an indication of the event through the at least one interface to the remote monitoring component; and
once an indication of the event is reported to the remote monitoring component, reporting the event from the remote monitoring component through the at least one interface of the remote monitoring component.

13. The method of claim 12, wherein each individual monitoring component includes a set of multiple monitors.

14. The method of claim 13, wherein each of the multiple monitors of the set are selectively activatable when instantiating each individual monitoring component.

15. The method of claim 14, wherein the set includes a service monitor, a debugger monitor, a window monitor, a time-out monitor, and a hang monitor.

16. The method of claim 12, further comprising starting the process to be monitored by specifying a target for the instantiated monitoring component from the remote monitoring component.

17. The method of claim 12, further comprising after receiving the indication of the event from the individual monitoring component, filtering the indication based upon at least one criteria and reporting the event from the remote monitoring component through the at least one interface of the remote monitoring component when the indication of the event passes through the filtering.

18. The method of claim 17, wherein filtering is performed by an event filter specific to each individual monitoring component and the event filter is configured to modify the indication of the event received from the individual monitoring component prior to reporting the indication of the event.

19. The method of claim 12, wherein detecting events further comprises separately detecting events for each session of the session table.

20. The method of claim 19, wherein reporting further comprises separately reporting detected events for each session of the session table through the interface corresponding to the monitor identified in the session.

* * * * *